US012223842B2

(12) United States Patent
Solomon et al.

(10) Patent No.: US 12,223,842 B2
(45) Date of Patent: *Feb. 11, 2025

(54) VESSEL SYSTEMS AND METHODS RELATING THERETO

(71) Applicant: PELAGIC DATA SYSTEMS, INC., San Francisco, CA (US)

(72) Inventors: David Belu Solomon, San Francisco, CA (US); Will Eamon Mcdonald, San Francisco, CA (US); Michael Burg, Portland, OR (US); Melissa Sara Garren, Carmel, CA (US)

(73) Assignee: PELAGIC DATA SYSTEMS, INC.

( * ) Notice: Subject to any disclaimer, the term of this patent is extended or adjusted under 35 U.S.C. 154(b) by 0 days.

This patent is subject to a terminal disclaimer.

(21) Appl. No.: 17/478,966

(22) Filed: Sep. 20, 2021

(65) Prior Publication Data

US 2022/0005359 A1 Jan. 6, 2022

Related U.S. Application Data

(63) Continuation of application No. 16/070,290, filed as application No. PCT/US2016/063183 on Nov. 21, 2016, now Pat. No. 11,151,884.

(Continued)

(51) Int. Cl.
*B63B 79/15* (2020.01)
*B63B 79/40* (2020.01)
(Continued)

(52) U.S. Cl.
CPC ............... *G08G 3/00* (2013.01); *B63B 79/15* (2020.01); *B63B 79/40* (2020.01); *G01C 21/203* (2013.01);
(Continued)

(58) Field of Classification Search
CPC ......... A61B 34/30; A61B 34/37; A61B 34/35; A61B 34/20; A61B 2034/301;
(Continued)

(56) References Cited

U.S. PATENT DOCUMENTS 8,594,866 B1 11/2013 Chen et al.
8,608,773 B2 * 12/2013 Tierney .................. A61B 34/30
606/205

(Continued)

OTHER PUBLICATIONS

Shahir et al., Maritime situation analysis framework: Vessel interaction classification and anomaly detection, 2015, IEEE, p. 1279-1289 (Year: 2015).*

(Continued)

*Primary Examiner* — McDieunel Marc
(74) *Attorney, Agent, or Firm* — EcoTech Law Group, P.C.

(57) ABSTRACT

Systems and methods for tracking vessel activities are described. An exemplar method of tracking vessel activities includes: (i) receiving data, using one or more devices, including vessel positioning data and/or time associated with one or more vessels traversing one or more paths on a body of water; (ii) deducing, using the data received from step (i), vessel attributes of one or more the vessels at certain positions and/or time along one or more of the paths; (iii) identifying, based on the vessel attributes of step (ii), one or more types of vessel activities of one or more of the vessels at the certain positions along one or more of the paths; (iv) parsing an electronic map of the body of water and land surrounding the body of water into discrete geographic zones; (v) grouping one or more types of vessel activities being carried out in each of the discrete geographic zones to arrive at one or more types of grouped vessel activities; (vi) causing to display or displaying one or more types of the (Continued)

grouped vessel activities that are being carried out in at least some of the discrete geographic zones.

15 Claims, 13 Drawing Sheets

Related U.S. Application Data

(60) Provisional application No. 62/278,994, filed on Jan. 15, 2016.

(51) Int. Cl.
| | |
|---|---|
| *G01C 21/00* | (2006.01) |
| *G01C 21/20* | (2006.01) |
| *G01S 19/42* | (2010.01) |
| *G05D 1/00* | (2006.01) |
| *G07C 5/08* | (2006.01) |
| *G08G 3/00* | (2006.01) |
| *H04W 4/029* | (2018.01) |
| *H04W 4/38* | (2018.01) |

(52) U.S. Cl.
CPC .......... *G01C 21/3807* (2020.08); *G01S 19/42* (2013.01); *G05D 1/0206* (2013.01); *G07C 5/0825* (2013.01); *H04W 4/029* (2018.02); *H04W 4/38* (2018.02)

(58) Field of Classification Search
CPC .......... A61B 90/361; A61B 2034/2055; A61B 2034/305; A61B 34/70; A61B 2090/3937; A61B 17/00234; A61B 34/25; A61B 90/37; A61B 2090/3983; A61B 34/74; A61B 34/76; A61B 17/0218; A61B 1/00149; A61B 1/00193; A61B 1/05; A61B 90/50; A61B 90/98; A61B 18/1445; A61B 2090/371; A61B 1/00087; A61B 2034/742; A61B 34/00; A61B 17/29; A61B 1/3132; A61B 2505/05; A61B 18/1477; A61B 1/00045; A61B 2017/3409; A61B 17/062; A61B 17/32; A61B 17/3201; A61B 17/34; A61B 18/1402; A61B 1/00006; A61B 1/00009; A61B 17/0483; A61B 17/1285; A61B 2017/00115; A61B 2017/00199; A61B 2017/00075; A61B 8/4444; B25J 9/1689; B25J 19/021; B25J 9/06; B25J 13/025; B25J 19/023; Y10T 74/20305; A61F 2002/30785; A61F 2002/30892; G06F 19/00; G06F 3/016; G06F 3/0346; G06F 3/011; G05B 19/00; G05B 2219/40174; G05B 2219/50391; G06N 20/00; G06N 5/04; Y10S 901/02; Y10S 901/15

See application file for complete search history.

(56) References Cited

U.S. PATENT DOCUMENTS

| | | | |
|---|---|---|---|
| 9,089,928 B2 | 7/2015 | Zediker et al. | |
| 9,345,544 B2 * | 5/2016 | Hourtash | A61B 34/30 |
| 9,492,235 B2 * | 11/2016 | Hourtash | B25J 9/1607 |
| 9,669,492 B2 | 6/2017 | Linyaev et al. | |
| 9,687,275 B1 * | 6/2017 | Fenton | A61B 17/4241 |
| 9,782,230 B2 * | 10/2017 | Smaby | G06F 16/214 |
| 10,118,681 B1 | 11/2018 | Andrasko et al. | |
| 10,149,729 B2 * | 12/2018 | Smaby | G06F 16/113 |
| 2007/0216566 A1 | 9/2007 | Wood | |
| 2010/0246331 A1 | 9/2010 | Paul et al. | |
| 2011/0209656 A1 | 9/2011 | Bernloehr et al. | |
| 2011/0257819 A1 | 10/2011 | Chen et al. | |
| 2012/0253566 A1 | 10/2012 | Ballou et al. | |
| 2013/0041523 A1 | 2/2013 | Jensen et al. | |
| 2013/0266380 A1 | 10/2013 | Capron et al. | |
| 2017/0227639 A1 | 8/2017 | Stokes et al. | |

OTHER PUBLICATIONS

Chang., Satellite-based vessel tracking and monitoring as the long range mode of AIS, 2005, IEEE, p. 1-5 (Year: 2005).*
Rizzuto et al., Validation of a simulation tool for ship traffic noise, 2015, IEEE, p. 1-7 (Year: 2015).*
Fiorini et al., Vessel route analysis by in situ measurements A pre-requisite for Maritime Spatial Planning, 2013, IEEE, p. 380-384 (Year: 2013).*
Notice of Allowance for Parent U.S. Appl. No. 16/070,290 mailed on Jun. 18, 2021, 10 Pages.
Non-Final Rejection for Parent U.S. Appl. No. 16/070,290 mailed on Dec. 28, 2020, 19 Pages.
Chang, Satellite-Based Vessel Tracking and Monitoring as the Long Range Mode of AIS, 2005, IEEE, 5 Pages.
Chen et al., System Design and Implement for the Management of Voyage Data of Vessels, 2007, IEEE, 6 Pages.
Li et al., Coordination for Efficient Transport over Water, 2015, 6 pages.
Shahir et al., Maritime Situation Analysis Framework: Vessel Interaction classification and anomaly detection, 2015, IEEE, 11 Pages.
International Search Report and Written Opinion for International Application No., PCT/US2016/063183, mailed on Feb. 16, 2017, 12 pages.

* cited by examiner

1200

Electronic Table

| Geographic Zones (1202) | Grouped Vessel Activity (1210) | Vessel Activity Quantity (1220) | Activity Weight (1230) | Vessel Activity Score (1240) | Geographic Zone Score (1250) |
|---|---|---|---|---|---|
| 1124 | Fishing | 2 | 4 | 8 | 2.2 |
|  | Drifting | 1 | 2 | 2 |  |
|  | Driving | 1 | 1 | 1 |  |
| — |  |  |  |  |  |
| — |  |  |  |  |  |
| — |  |  |  |  |  |

*FIG. 12*

VESSEL SYSTEMS AND METHODS RELATING THERETO

RELATED APPLICATION

This application is a Continuation of U.S. patent application Ser. No. 16/070,290, which was filed on Jul. 16, 2018 which is a National Stage Application of PCT/US2016/063183 filed on Nov. 21, 2016, which in turns claims the priority from U.S. Provisional Application No. 62/278,994, filed on Jan. 15, 2016, which are incorporated herein by reference for all purpose.

FIELD OF THE INVENTION

The present teachings relate to vessel systems and methods relating to management of vessels and/or fleets. More particularly, the present teachings relate to an integrated data collection and analytics systems and methods for managing vessels and/or fleets by collecting data and analyzing the collected data to determine vessel activities during one or more vessel paths.

BACKGROUND OF THE INVENTIONS

A vessel may perform various activities when it is utilized during various trips or vessel paths. Conventionally, to determine which vessel activities occurred along a vessel path, an entity overseeing or managing a vessel and/or fleet relies on information received from a crewmember onboard one or more of the vessels. However, collecting this information is unreliable because the crewmember may not have full grasp of the facts surrounding the vessel activity, and it is also time consuming because it takes a long time from when information is recorded to the point when it is available for analysis. As a result, the current methods of vessel management that rely on a crewmember do not represent a commercially viable solution.

Moreover, in certain jurisdictions vessels have to comply with various regulatory requirements to preserve marine resources. To this end, harvesting activities of one or many vessels require monitoring. Running afoul of regulatory requirements may translate into lost profits for the fleet and depleted marine resources.

Furthermore, often vessels leave or lose fishing gear in the water that over time, traps numerous fish and other marine life that leaves the marine resources in a significantly depleted state.

Therefore, a need exists for commercially viable systems and methods for fleet management that do not suffer from the drawbacks those conventional techniques of fleet management and effectively address the regulatory and lost fishing gear problems.

SUMMARY OF THE INVENTION

To this end, the present arrangements and teachings offer vessel and/or fleet management systems and methods to identifying various activities relating to vessels. More particularly, the present teachings relate to methods of collecting data and analyzing the collected data to track and determine the activities of vessels of any type.

In one aspect, the present arrangements provide fleet management systems. One such exemplar fleet management system comprises: (i) a first data collection system including a first core device and one or more first external sensors; (ii) a second data collection system including a second core device and one or more second external sensors; (iii) a mobile network that commutatively couples the first core device and one or more of the first external sensors to the second core device and one or more of the second external sensors. In this configuration, each of the first core device and the second core device is capable or communicating with one or more of the first external sensors and one or more of the second external sensors. In one embodiment of the present arrangements, the first data collection system is located on a first vessel and the second data collection system is located on a second vessel. The mobile network, in one embodiment of the present arrangements, is a wireless network located on any one of the first vessel, the second vessel or another vessel that is not the same as the first vessel and the second vessel.

The vessel and/or fleet management system, in one embodiment of the present arrangements, further comprising a network, which is different from the mobile network, that communicatively couples to the first core device and/or the second core device when the first vessel and/or the second vessel are proximate to the network. Information obtained from the first data collection system and/or the second data collection system is conveyed through the network to an analytics system (e.g., a server and/or one or more client devices).

In another embodiment of the present teachings, the vessel and/or fleet management system includes: (i) a processor for executing code; (ii) memory, coupled to the processor, for storing code to be executed by the processor; and (iii) at least one interface, coupled to the processor, operable to provide a communication link from the processor to one or more client devices and that is used for transmitting and/or receiving information. In this embodiment of the present arrangements, the processor performs operations of: (a) receiving data, using one or more devices, including vessel positioning data and/or time associated with one or more vessels traversing one or more paths on a body of water; (b) deducing, using the data, vessel attributes of one or more of the vessels at certain positions and/or time along one or more of the paths, wherein the certain positions and/or time are obtained from vessel positioning data and/or time and the vessel attributes provide information, pertaining to one or more of the vessels at the certain positions and/or time along one or more of the paths, regarding at least one subject chosen from a group comprising the position and/or orientation relative to certain predefined locations, value of underlying water depth, velocity and/or acceleration, turn angle and geometry of path; (c) identifying, based on the vessel attributes, one or more types of vessel activities of one or more of the vessels at the certain positions and/or time along one or more of the paths, and one or more types of the vessel activities includes at least one activity chosen from a group comprising driving, gear-disposition, fishing, drifting and idling; (d) parsing an electronic map of the body of water and land surrounding the body of water into discrete geographic zones, each of which defines a boundary around a water region and/or a land region that is located within the electronic map and some of which include at least a portion of one or more of the paths of one or more of the vessels; (e) grouping one or more types of vessel activities being carried out in each of the discrete geographic zones to arrive at one or more types of grouped vessel activities; and (f) causing to display or displaying one or more types of grouped vessel activities that are being carried out in at least some of the discrete geographic zones. One or more of the devices may include at least one device chosen from a group including core device that having a data upload radio to communicate with a network server disposed external to the vessel and an external sensor.

In another aspect, the present teachings also provide a method of tracking vessel activities. One such exemplar method includes: (i) receiving data, using one or more devices, including vessel positioning data and/or time associated with one or more vessels traversing one or more paths on a body of water. Another step (ii) involves deducing, using the data received from step (i), vessel attributes of one or more the vessels at certain positions and/or time along one or more of the paths. Preferably the certain positions and/or time are obtained from vessel positioning data and/or time along one or more of the paths. Furthermore, the vessel attributes provide information regarding at least one subject chosen from a group including the position and/or orientation relative to certain predefined locations, value of underlying water depth, velocity and/or acceleration, turn angle and geometry of path. The method further includes a step (iii) of identifying, based on the vessel attributes of step (ii), one or more types of vessel activities of one or more of the vessels at the certain positions along one or more of the paths. One or more types of the vessel activities includes at least one activity chosen from a group including driving, gear-disposition, fishing, drifting and idling. Another step (iv), includes parsing an electronic map of the body of water and land surrounding the body of water into discrete geographic zones, each of which defines a boundary around a water region and/or a land region that is located within the electronic map and some of which include at least a portion of one or more of paths of one or more the vessels. The method then proceeds to another step (v). This step (v) involves grouping one or more types of vessel activities being carried out in each of the discrete geographic zones to arrive at one or more types of grouped vessel activities. Next, a step (vi) includes causing to display or displaying one or more types of the grouped vessel activities that are being carried out in at least some of the discrete geographic zones.

In one embodiment of the present teachings, one or more of the devices (described in step (i)) includes a core device that has a data upload radio to communicate with a network server disposed external to the vessel and one or more external sensors. In another embodiment of the present teachings, the core device includes an inter-device radio for communicating with one or more of the external sensors. In yet another embodiment of the present teachings, the device further includes an external sensor including a sensor not incorporated inside and disposed external to the core device.

In one embodiment of the present teachings, the receiving step (i) includes receiving data from at least one sensor chosen from a group including accelerometer sensor, compass sensor, gyroscope sensor, vibration sensor, humidity sensor, salinity sensor, motor load sensor, depth sensor, pressure sensor, light sensor, internal core device sensor, solar panel irradiance sensor, battery charge sensor, altimeter sensor, Automatic Identification System ("AIS") receiver/data logger, motor-run sensor, personnel sensor, fish-hold temperature sensor, water temperature sensor, and auxiliary detachment sensor.

In another embodiment of the present teachings, the receiving step (i) includes receiving one or more type of data. Each data type is associated with at least one vessel and is chosen from a group including vessel size, vessel capacity, vessel target species, vessels onboard gear, vessel infractions, and previous vessel trips.

In yet another embodiment of the present teachings, the receiving step (i) includes receiving one or more types of external data. Each data type is chosen from a group including vessel elevation, depth of water, water temperature, water current velocity and/or direction, thermocline and/or mixed water layer depth, chlorophyll content or other proxy for primary productivity, ocean color, wave height, weather, wind speed, air temperature, cloud cover, sun rise, sun set, and tides.

In one embodiment of the present teachings, the core device includes at least one internal sensor chosen from a group including light sensor, accelerometer, compass, internal temperature sensor, solar panel irradiance sensor, global positioning sensor, altimeter, gyroscope and batter charging and/or performance sensor.

In another embodiment of the present teachings, the step of displaying or causing to display includes generating one or more electronic maps.

In yet another aspect, the present teachings provide a method of tracking vessel activity. The method includes: (i) receiving data, using one or more devices, including vessel positioning data and/or time associated with one or more vessels traversing one or more paths on a body of water. Another step (ii) involves deducing, using the data received from step (i), vessel attributes of one or more of the vessels at certain positions and/or time along one or more of the paths. Preferably the certain positions and/or time are obtained from vessel positioning data and/or time along one or more of the paths. Furthermore, the vessel attributes provide information regarding at least one subject chosen from a group including the position and/or orientation relative to certain predefined locations, value of underlying water depth, velocity and/or acceleration, turn angle and geometry of path. The method further includes step (iii) of identifying, based on the vessel attributes of step (ii), one or more types of vessel activities of one or more of the vessels at certain positions along one or more of the paths. One or more types of vessel activities include at least one activity chosen from a group including driving, gear-disposition, fishing, drifting and idling. Another step (iv) includes assigning an activity weight value to each type of the vessel activities. After step (iv), another step (v) involves parsing an electronic map of the body of water and land surrounding the body of water into discrete geographic zones, each of which defines a boundary around a water region and/or a land region that is located within the electronic map and some of which include at least a portion of one or more of the paths of one or more of the vessels. The method then proceeds to another step (vi). This step (vi) involves grouping one or more types of vessel activities being carried out in each of the discrete geographic zones to arrive at one or more types of grouped vessel activities within the discrete geographic zone. Next, a step (vii) includes calculating, using the activity weight value of step (iv) for each type of the vessel activities, a vessel activity score for each type of the grouped vessel activities within the discrete geographic zones or calculating a score for each of the discrete geographic zones.

In one embodiment of the present teachings, the one or more devices include at least one device chosen from a group including a core device and an external sensor. The core device includes an inter device radio. The external sensor includes a sensor not incorporated inside and disposed external to the core device.

In one embodiment of present teachings, the method further includes causing to display and/or displaying the vessel activity score for each type of the grouped vessel activities within the discrete geographic zones. By way of example, the vessel activity score is a fishing pressure score for each of the discrete geographic zones.

In another embodiment of the present teachings, the method further includes causing to display and/or displaying the score for each of the discrete geographic zones.

In another embodiment of the present teachings, the step of identifying one or more of the vessel activities includes: (a) analyzing, at a location and/or time of the vessel along one or more paths of the vessel on the body of water, one or more vessel attributes at and around the location and/or time to arrive at a vessel attribute type; and (b) matching the vessel attribute type to a corresponding predefined vessel activity. In this embodiment of the present teachings, the method may further include causing to display and/or displaying, based on the attribute in the analyzing step (a), the position of the vessel as broken up sub-paths.

The construction and method of operation of the invention, however, together with additional objects and advantages thereof, will be best understood from the following descriptions of specific embodiments when read in connection with the accompanying figures.

BRIEF DESCRIPTION OF THE DRAWINGS

FIG. 12 shows an electronic table, according to one embodiment of the present teachings and that includes, for each discrete geographic zone, grouped vessel activity, vessel activity quantity, vessel weight, vessel activity score and geographic zone score.

DETAILED DESCRIPTION OF THE DRAWINGS

In the following description, numerous specific details are set forth in order to provide a thorough understanding of the present invention. It will be apparent, however, to one skilled in the art that the present invention may be practiced without limitation to some or all of these specific details. In other instances, well-known process steps have not been described in detail in order to not unnecessarily obscure the invention.

Figure 1:
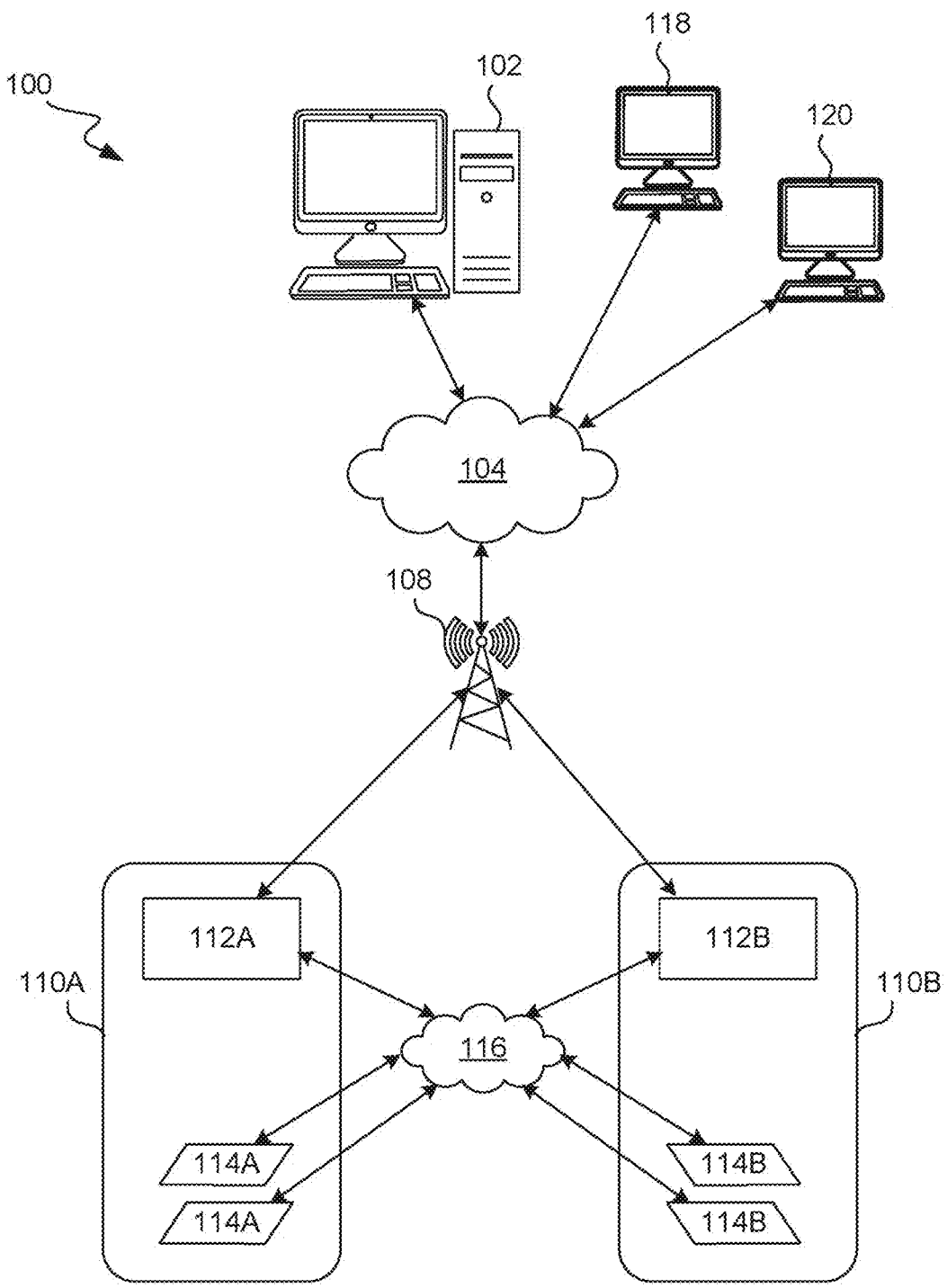
FIG. 1 shows a vessel or fleet management system, according to one embodiment of the present teachings and that couples one or more data collection systems to an analytics system, i.e., a server and/or a client device, for computing vessel activities.

FIG. 1 is an illustrative schematic of a vessel or fleet management system (hereinafter referred to as "system") 100, according to one embodiment of the present arrangements and that includes an analytics system, i.e., computing devices 102, 118, and 120, and multiple data collection systems, i.e., data collection systems 110A and 110B. In the embodiment shown in FIG. 1, computing device 102 is a server and computing devices 118 and 120 are referred to as "client devices." A network 104 couples server 102, client devices 118 and 120, and data collection system 110A and 110B, to enable communication amongst them. In certain preferred embodiments of the present arrangements, a mobile network 108 provides wireless communication between server 102 to data collections systems 110A and 110B.

As will be appreciated to those skilled in the art, any computing devices (e.g., server, desktop computer, laptop computer, tablet, or mobile device) may be used as server 102 and/or computing devices 118 and 120 and configured to perform some or all of the functions contemplated in the present teachings. Representative client devices 118 and 120 include a cellular telephone, a portable digital assistant, a tablet, a stationary computing appliance, wearable computing device, and/or an Internet of Things ("IoT") device. In certain embodiments of the present arrangements, each or any one of server 102 and client devices 118 and/or 120 are a wireless machine, which is in wireless communication with network 108. In this embodiment of the present arrangements, a server 102 facilitates interaction and data flows to and from any of client devices 118 and/or 120. In general, server 102 may include one or more computers and data storage devices, and may produce programming instructions, files, or data that may be transmitted over network 104 to client devices 118 and/or 120, which may be used by a user to enter a protocol, to run a protocol, including entering data, and/or analyzing data stored on server 102.

Data collection system 110A includes a core device 112A and one or more external sensors (hereafter referred to as "external sensors") 114A. Similarly, data collection system 110B includes a core device 112B and one or more external sensors external sensors (hereafter also referred to as "external sensors") 114B. External sensors 114A and/or 114B may be any sensor that is commutatively coupled to but preferably not incorporated inside core device 112A and/or 112B. In other words, core device 112A and 112B may receive information from external sensors 114A and/or 114B, but external sensors 114A and/or 114B need not be part of core device 112A and 112B, respectively.

Core devices 112A and 112B provide a mechanism from which data collection system 110A and/or 110B communicate with server 102. In this manner, any information received by data collection system 110A and/or 110B may be transmitted to server 102. During an operative state of system 100, core device 112A is coupled to a first vessel and core device 112B is coupled to a second vessel. As each vessel traverses one or more paths in a body of water, core device 112A receives and transmits information relating to the first vessel to server 102 and core device 112B receives and transmits information relating to the second vessel to the same server or a different server that is communicatively coupled to server 102. Similarly, server 102 may transmit information (e.g., software updates, patches, programmed instructions) to data collection system 112A and/or 112B.

In certain embodiments of the present arrangements, system 100 includes a vessel network 116, which communicatively couples core devices 112A and/or 112B to external sensors 114A and/or 114B, respectively. In this manner, core device 112A is capable of receiving information from external sensor 114A and core device 112B is capable of receiving information from external sensor 114B. The present teachings recognize that vessel network 116 may by a wired or wireless network, which may be, for example and without limitation, Ethernet cable, a cellular telephone network, a Wi-Fi network or a Wi-Max network, a Blue Tooth network, a radio frequency (e.g., RFID), infrared, and near field magnetics (e.g., Near Field Communication or "NFC").

In one embodiment of the present arrangements, vessel network 116 also permits client device 112A of data collection system 110A to communicate with data collection system 110B (i.e., core device 112B and/or external sensors 114B). In this manner, core device 112A is capable of receiving information from data collection system 110B, and transmitting the information to server 102. Similarly, client device 112B, of data collection system 110B, is commutatively coupled to data collection system 110A (i.e., core device 112A and/or external sensors 114A). Information received from data collection system 110B may be transmitted to server 102 using core device 112A. Thus, server 102 is capable of receiving information from a data collection system without being in direct communication with that data collection system. As discussed above, one example of achieving this result is by having one data collection system conveying information to another data collection system, which further conveys it to a server, which may in turn convey it to other servers, data collections systems and/or vessels.

By way of example, during operation of system 100, data collection system 110A of a first vessel, may receive information from data collection system 110B of second vessel (e.g., when the first vessel and the second vessel are proximate to each other and network 116 commutatively couples core device 112A to core device 112B). Data collection system 110B may then first transmit certain vessel information to data collection system 110A, from where the certain vessel information is conveyed to server 102. This allows server 102 to receive information from the second vessel even if the second vessel is not capable of communicating with server 102 (e.g., the second vessel is at sea for an extended period of time).

Figure 2A:
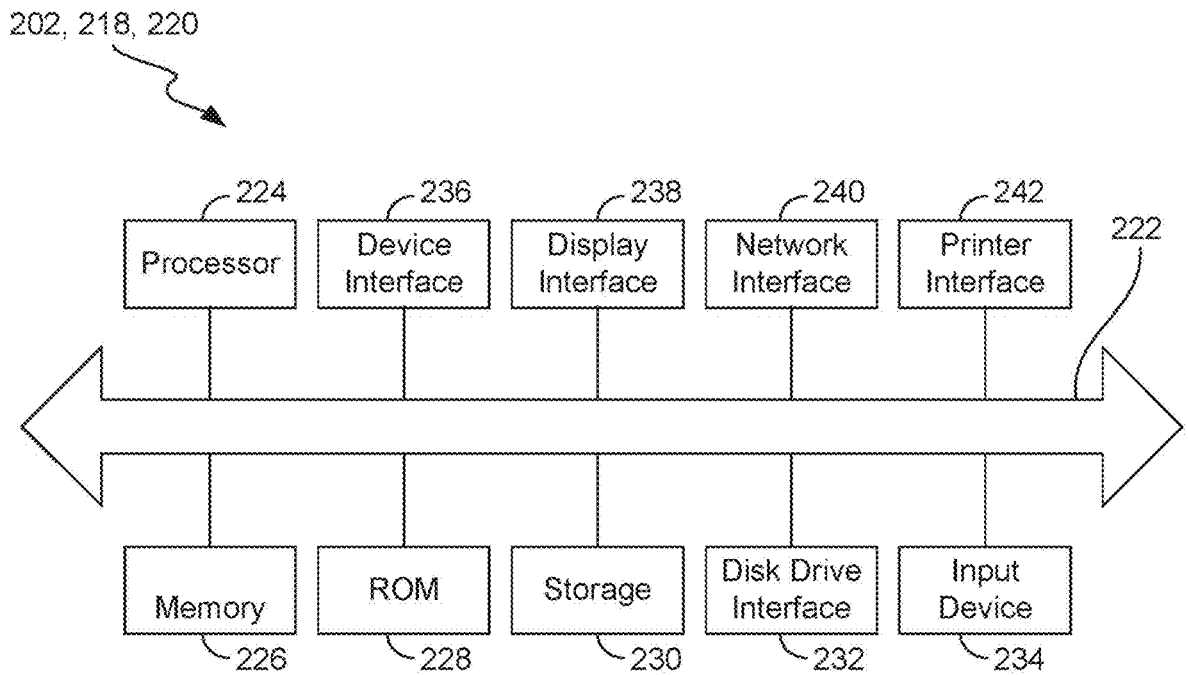
FIG. 2A shows internal construction blocks of a computing machine, according to another embodiment of the present arrangements and that may be implemented as the server and/or a client device shown in FIG. 1.

FIG. 2A shows internal construction blocks of a server 202 and/or client devices 218 and 220, in accordance with one embodiment of the present arrangements. Server 202 and client devices 218 and 220 are substantially similar to their counter parts server 102, and client devices 118 and 220 of FIG. 1. Each of server 202 and client devices 218 and 220 include a data bus 222 that allows for communication between modules, such as a processor 224, memory 226, an input device 234, a display interface 238, and a network interface 240. The present teachings recognize that the network interface 240, memory 226, and processor 224 of each of server 202 and client devices 218 and 220 are configured such that a program stored in memory 226 may be executed by processor 224 to accept input and/or provide output through network interface 240 over a network (e.g., network 108 of FIG. 1) to another server/client device on a system (e.g., vessel or fleet management system 100 of FIG. 1).

Network interface 240 of each of server 202 and client devices 218 and 220 is used to communicate with another device on a system over a wired or wireless network, which may be, for example and without limitation, a cellular telephone network, a Wi-Fi network or a Wi-Max network or a Blue Tooth network, and then to other telephones through a public switched telephone network (PSTN) or to a satellite, or over the Internet. Memory 226 of devices 202, 218 and/or 220 includes programming required to operate each or any one of server 202 and client devices 218 and/or 220, such as an operating system or virtual machine instructions, and may include portions that store information or programming instructions obtained over a network (e.g., network 104 of FIG. 1), or that are input by the user.

Furthermore, processor 224 executes certain instructions to manage all components and/or client devices and interfaces coupled to data bus 222 for synchronized operations. Device interface 236 may be coupled to an external device such as another analytics system (e.g., server 102 and client devices 104 and/or 106 of FIG. 1A). In other words, one or more resources in the analytics system may be utilized. Also interfaced to data bus 240 are other modules such as disk drive interface 232, a printer interface 242, and one or more input devices 234, such as touch screen, keyboard, or mouse. In one embodiment of the present arrangements, display interface 238 and input device 234 of client device 118 and 220 are physically combined as a touch screen 238/234, providing the functions of display and input. Generally, a compiled and linked version or an executable version of the present invention is loaded into storage 230 through the disk drive interface 232, the network interface 240, the device interface 236 or other interfaces coupled to the data bus 222.

In relation to server 202, memory 226, such as random access memory (RAM) is interfaced to the data bus 222 to provide processor 224 with the instructions and access to memory storage 230 for data and other instructions, applications or services. In particular, when executing stored application program instructions, such as the complied and linked version of the present invention, processor 224 is caused to manipulate the data to achieve results described herein. A ROM (read only memory) 228, which is also connected to data bus 222, is provided for storing invariant instruction sequences such as a basic input/output operation system (BIOS) for operation of display interface 238 and input device 234, if there is any. In general, server 202 is coupled to a network and configured to provide one or more resources to be shared with or executed by another computing device on the network or simply as an interface to receive data and instructions from a human being.

While FIG. 2A illustrates one embodiment of server 202 and client devices 218 and 220, it should be noted that not every module shown in FIG. 2A would have to be in server 202 and/or client devices 218 and 220 in order to be used in one embodiment of the present invention. Depending on the configuration of a specific server 202 or a specific client device 218 and/or 220, some or all of the modules may be used and sufficient in one embodiment of the present invention.

Figure 2B:
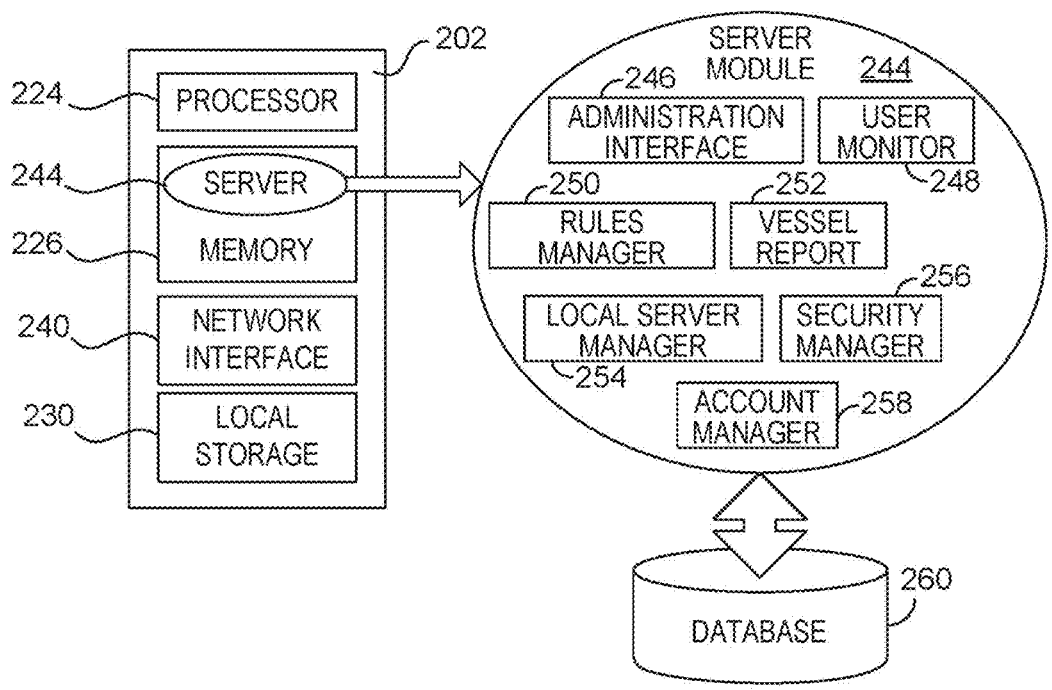
FIG. 2B shows an exemplar functional block diagram of the server of FIG. 2A and that includes a memory space, which in turn includes a server module executable by one or more processors.

Referring now to FIG. 2B, there is shown an exemplar functional block diagram of server 202, according to one embodiment of the present arrangements and in which a server module 244 resides as software in a memory 226 and is executable by one or more processors 224. According to one embodiment of the present arrangements, server module 244 is provided to memory 226 and executed in server 202 to manage various communications with one or more the data collection systems (e.g., data collection systems 110A and 110B of FIG. 1).

Depending on implementation, server 202 may be a single server or a cluster of two or more servers. Server 202, according to one embodiment of the present arrangements, is implemented as cloud computing, in which there are multiple computers or servers deployed to serve as many client devices as practically possible. For illustration purpose, a representative of a single server 202 is shown and may correspond to server 102 in FIG. 1. Sever 202 includes a network interface 240 to facilitate the communication between server 202 and other devices on a network and a local storage space 230. The server module 244 is an executable version of one embodiment of the present intention and delivers, when executed, some or all of the features/ results contemplated in the present invention.

According to one embodiment of the present arrangements, server module 232 comprises an administration interface submodule 246, a user monitor submodule 248, a rules manager submodule 250, a vessel report submodule 252, a local server manager submodule 254, a security manager submodule 256, and/or account manager submodule 258. However, depending on the configuration of server module 232, some or all of the submodules components may be used.

Submodules 246, 248, 250, 252, 254, 256, and 258, when executed on processor 224, allow a user of server 202 with administrator privileges to operate server 202 to perform tasks, which are generally indicated by the submodule names. Thus "administration interface" submodule 246, when executed on server 202, enables a system administrator to register (or add) a user and grant respective access privileges to the users. Administration interface submodule 246 is an entry point to server module 244 from which all sub-modules or the results thereof can be initiated, updated and managed. By way of example, user A, a vessel fleet manager, may be allowed to receive information related to vessel activities for vessels in a specific fleet. User A, however, does not have access to other vessels that are not under his or her management. As another example, user B, a government agency, may be able to access information relating to all vessel activities pertaining to a predetermined geographic region (see predetermined geographic region shown in FIGS. 9 and 10). In this example, User B has access to vessel activities relating to a 11 vessels that traverse through the predetermined geographic region, including user A's fleet or any other vessel.

In one embodiment, an administrator sets up and manages one or more of the following processes:
  The digital maps and geographic regions available to the user;
  The vessel legal restrictions provided to the user;
  The allocation of data collection systems to vessel (e.g., core device and/or external sensor);
  The updating or configuration of the data collection system;
  The type or nature of inputs the user has access to;
  Times at which the user can see or use the inputs;
  Vessel or fleet groups the user can join; and
  Creating of one or more vessel or fleet groups.

Account manager submodule 258, which has access to a database 260 or an interface to a database 260, maintains records of registered users and their respective access privileges. Database 260 may be located on server 202 or client device 218 and/or 220. In operation, account manager submodule 258 authenticates a user when the user logs onto server 202 and also determines if the user may access information stored by server 202. By way of example, when a user tries to log on to server 202, the user is prompted to input confidential signatures (e.g., username and password). Account manager submodule 258 then allows server 202 to the confidential signatures. If the confidential signatures are successfully verified, the user is authenticated and is provided access the vessel or fleet management system (e.g., vessel or fleet management system 100 of FIG. 1). In general, account manager submodule 258 is where an operator of system 100 may be able to control its users.

Security manager submodule 256 is configured to provide security when needed. When necessary, messages, data or files being accesses and/or shared among registered users may be encrypted thus only authorized user may access the secured messages, data or files. In certain embodiments of the present arrangements, an encryption key to a secured file is securely maintained in security submodule 256 and can be retrieved by the system administrator to access a secured document in case the key in a client machine is corrupted or the user or users who have the access privilege to access the secured document are no longer available. In another embodiment, the security manager submodule 256 is configured to initiate a secure communication session when it detects that a registered user accesses a file list remotely over an open network.

User monitor submodule 248 is configured to monitor the status of registered users and generally works in conjunction with account manager submodule 258. In particular, user monitors submodule 248 is configured to manage all registered users as a single vessel or a single fleet group and individual users in a private vessel or fleet group so that unauthorized users would not get into a group they are not permitted. In addition, user monitor 248 is configured to push or deliver related messages, updates, and uploaded files, if there is any, to a registered user.

Local server manager submodule 254, in some cases, is a collaborative communication platform that needs to collaborate with another collaborative communication platform so that users in one collaborative communication platform can communicate with users in another collaborative communication platform. In this case, a server responsible for managing a collaborative communication platform is referred to as a local server. Accordingly, local server manager submodule 254 is configured to enable more than one local server to communicate. Essentially, server 202 in this case would become a central server to coordinate the communication among the local servers.

Rules manager submodule 250 is used to configure various rules imposed across the system to control the type of information a user can access. For example, certain rules are provided to certain users depending on the status of the user (e.g., a vessel manager, a fleet manager, a government agency, and a non-profit), which allows the user to access certain information related to vessel activities.

A vessel report manager submodule 240 module is configured to record or track all information—or reports—received from and transmitted to one or more data collection system (e.g., data collection system 110A and 110B of FIG. 1). This information is retained for a period of time so that one or more users may access vessel during that period of time. In one embodiment of the present arrangements, certain types of information are kept for a predefined time in compliance of regulations or retention of evidences. In operation, vessel report manager submodule 252 works in conjunction with database 260 and indexes retained vessel reports for later retrieval. In another embodiment of the present arrangements, vessel report manager submodule 252 is configured to record all types of events that include, but may not be limited to, dates and times information was uploaded to server 202 and when an vessel activity information is accessed by a user.

In one embodiment of the present arrangements, server module 244 is, uniquely designed, implemented and configured to dynamically change the visual representation one or more vessel activities that are being carried out in one or more discrete geographic zones. An example of a collection of discrete geographic zones (which may combine to define a predetermined geographic region) are denoted by reference numeral 924 and shown in FIG. 9. The present teachings recognize that the process of visually displaying a vessel's activities or multiple vessels' activities is not something a general computer is capable of performing by itself. A general computer must be specifically programmed or installed with a specifically designed module such as the server module 244 according to one embodiment of the present invention to perform this process. To this end, in certain embodiments of the present arrangements, server module 244 of FIG. 2B and a client module in client device (e.g., client device 118 and/or 120 of FIG. 1) include instructions to cooperatively achieve one or more of the following specialized functions: 1) identifying, using positioning data and/or time associated with one or more vessels, vessel attributes of one or more of the vessels along one or more paths; 2) computing, based vessel attributes, one or more types of vessel activities that may be occurring within each of different geographic zones; 3) grouping one or more types of vessel activities being carried out in each of the discrete geographic zones to arrive at one or more types of grouped vessel activities; 4) causing to display or displaying one or more types of grouped vessel activities that are being carried out in at least some of the discrete geographic zones; and/or 5) calculating a score for each type of the grouped vessel activities within a discrete geographic zone or calculating a score for each discrete geographic zones.

It should be pointed out that server module 244 in FIG. 2B lists some exemplar modules according to one embodiment of the present invention and not every module in server module 244 has to be implemented in order to practice the present invention. The present teachings recognize that given the description herein, various combinations of the modules as well as modifications thereof, without departing the spirits of the present arrangements, may still achieve various desired functions, benefits and advantages contemplated in the present teachings.

Figure 3:
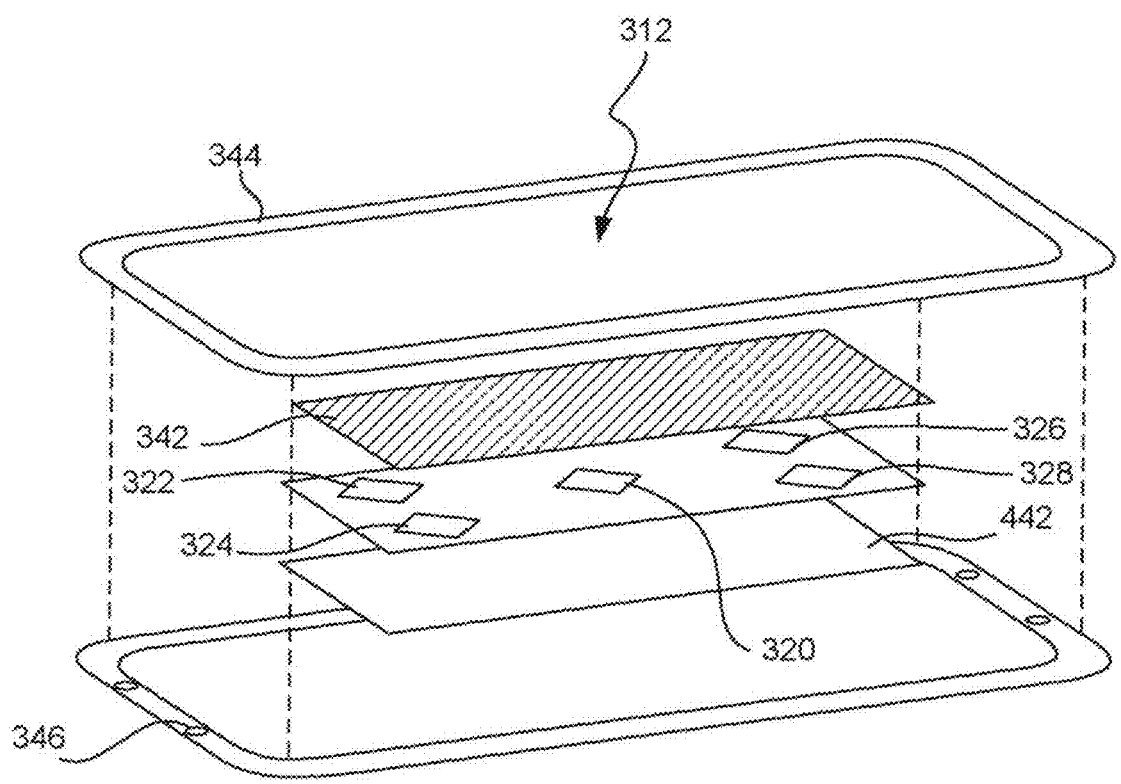
FIG. 3 shows a core device, according to one embodiment of the present arrangements and that may be implemented as part of the data collection system of FIG. 1.

FIG. 3 shows a core device 312, according to one embodiment of the present arrangements and that is substantially similar to core device 112A and 112B of FIG. 1. Core device 312 includes various components contained inside a sealed waterproof enclosure 344. These components may include a processor and memory 320, a global-positioning system ("GPS") receiver 322, additional sensors 324, a data upload radio 326, an inter device radio 328, a solar cell or panel 342 and a battery 442. Core device 312 may be secured to a vessel using attachment points 346.

Solar cell or panel 340 may be used to power core device 312 and/or recharge battery 442. Furthermore, battery 442 may be used to supplement power to core device 312 when solar cell or panel 340 does not produce enough power, for example, when clouds prevent full sun exposure to solar cell or panel 340. Software, stored and run by processor and memory 320, may be used to determine which energy source to use to extend the power available to core device 312.

GPS receiver 322 is capable of receiving information relating to the location of core device 312 and, in certain embodiments of the present arrangements, a time (e.g., time of day and date) associated with the location of core device 312. GPS receiver 322 may be programmed to retrieve the location of core device 312 contiguously or at various intervals of time. The frequency at which GPS receiver 322 receives the location of core device 312 may be adjusted based on certain parameters, for example, the accuracy of the path of core device 312 travels over a period of time. If a highly accurate path is desired, GPS receiver 332 may receive core device 312 location in short increments of time (e.g., every about 1 second to about 5 seconds). Conversely, GPS 322 receiver may receive core device 312 location at greater time intervals (e.g., every about 1 minute to about 5 minutes) if a high accuracy is not required or if core device 312 is moving slowly. Furthermore, the time interval may be adjusted to prevent GPS receiver 322 from draining too much power from core device 312 to ensure continuous operation.

Additional sensors 324 collect information relating to core device 312 and/or the environment external to core device 312. Addition sensor 324 may include at least one member chosen from a group including accelerometer sensor, compass sensor, gyroscope sensor, vibration sensor, humidity sensor, salinity sensor, motor load sensor, depth sensor, pressure sensor, light sensor, solar panel irradiance sensor, battery charge sensor, altimeter sensor, Automatic Identification System ("AIS") receiver/data logger, motor-run sensor, personnel sensor, fish-hold temperature sensor, water temperature sensor, internal temperature sensor, and auxiliary detachment sensor.

Data upload radio 326 contained in core device 312 is used to communicate with a server (e.g., server 102 of FIG. 1) preferably in a bidirectional manner. Uploaded information from core device 312 to the server may include the collected from GPS receiver 322 and/or additional sensors 324. Acknowledgement messages may also be uploaded in response to commands downloaded from the server. Downloaded messages may include commands to change the operational behavior of the device, and firmware updates intended for the device itself and/or sensor firmware updates.

Data upload radio 326 may be a device capable of transmitting information from core device 312 to the server. In one preferred embodiment of the present arrangements, data upload radio 326 is a cellular radio. In another preferred embodiment of the present arrangements, data upload radio is a wireless router.

In one embodiment of the present arrangements, inter-device radio 328 allows core device 312 to communicate with one or more other core devices that also have inter-device radio 328. Communication between two or more core devices may be transmitted through, for example, a vessel network (e.g., vessel network 116 of FIG. 1). Inter-device radio 328 may transmit information received from GPS receiver 322 and/or additional sensors 324 to another core device. In this manner, the server is capable of receiving information relating to core device 312 even if core device 312 cannot connect with the server.

Information received from inter-device radio 328, additional sensors 324, GPS receiver 322 may be stored in processor and memory 320. In one embodiment of the present arrangements, processor and memory 320 includes executable software that transforms information received from additional sensors and GPS into an encoded data packet(s). The transferrable data packet(s) allow core device 312 to transmit the information in a form that is smaller in size than the original information, which allows for faster uploading to the server (e.g., server 102 of FIG. 1).

Processor and memory 320 may also include executable software for automatically transmitting data to a server. As another example, executable software periodically connects to a terrestrial (cellular) network 108 to upload stored data and/or information from its memory. As yet another example, executable software uses GPS receiver 322 to identify locations where it has successfully connected to a cellular network (e.g., cellular network 108 of FIG. 1) and preferentially transmits information and/or date when it is at one of those locations of connection. As yet another example, using executable software, a server (which is executing code) receives data and/or information from a core device 312 and associates that data and/or information with previously obtained data and/or information from core device 312. In one embodiment of the present teachings, information, which is transferred from core device 312 to the server, relates to at least one type of information chosen from a group comprising vessel information, information about persons pertaining to a vessel, information about equipment used on vessel, environmental information such as weather, bathymetry, tides, currents, wind speeds, and localities relating to one or more vessels.

Figure 4A:
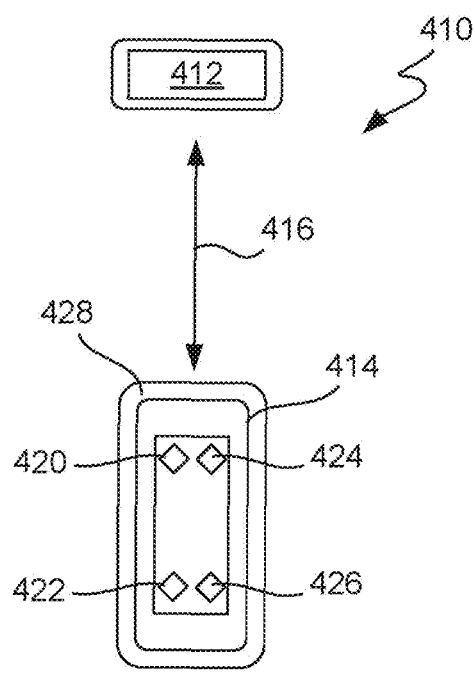
FIG. 4A shows a data collection system, according to one embodiment of the present arrangements and that may be incorporated into the vessel or fleet management system of FIG. 1 to collect temperature data.

FIG. 4A shows a data collection system 410, according to one embodiment of the present teachings and that includes an external sensor 414 for measuring temperature. Data collection system 410 includes a core device 412 commutatively coupled, using vessel network 416, to external sensor 414. Data collection system 410, core device 412, vessel network 416 and external sensor 414 are substantially similar to their counterparts, i.e., data collection system 110, core device 112A and/or 112B, vessel network 116, external sensor 114A and/or 114B of FIG. 1.

External sensor 414 may be positioned at any location that is external to core device 412. By way of example, external sensor 414 may be positioned on a location chosen from a group comprising engine room, deck, railing, roof, catch compartment, hold, coolers, mast, motor, gear, traps, buoys, personnel, below the waterline, above the waterline, above deck and below deck.

External sensor 414 includes various components contained inside a sealed waterproof enclosure 428. In one embodiment of the present arrangements, the components may include a processor and memory 420, a battery 422, an inter-device radio 424 and a temperature sensor 426. Temperature sensor 426 receives temperature information outside of external sensor 414, which is then stored in processor and memory 420. Inter-device radio 424 transmits temperature information to core device 412, which is ultimately transmitted to a server (e.g., server 102 of FIG. 1).

External sensor 414 may includes more than one type of sensor. By way of example, data collection system 410 of FIG. 4B, includes an external sensor 414 with two sensors: a salinity sensor 434 and a pressure sensor 426. Salinity sensor 434 is coupled to salinity sensor circuitry that measures a conductivity of a fluid in contact with salinity sensor 434. Pressure sensor 436 measures a fluid pressure, which depends on fluid depth.

Figure 4B:
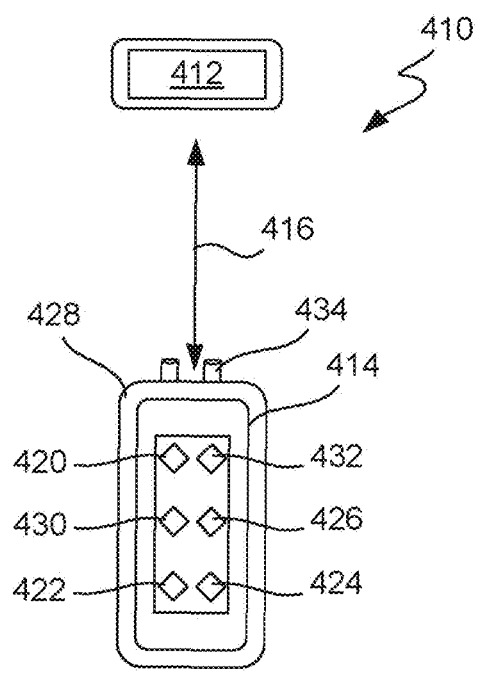
FIG. 4B shows a data collection system, according to another embodiment of the present arrangements and that may be incorporated into the vessel or fleet management system of FIG. 1 to collect information related to salinity and fluid pressure.

External sensor 414 of FIG. 4B also includes a NFC radio 430, which allows external sensor 414 to communicate with a NFC reader that is proximate to NFC radio 430. NFC radio 430 may be used to identify, for example, a gear before it is deployed in a body of water.

Any sensing mechanism (e.g., a sensor) may be incorporated into external sensor 414. Representative sensing mechanisms that may be part of external sensor 414 include at least one member chosen from a group comprising motor-run sensor, personnel sensor, fish-hold temperature sensor, water temperature sensor, accelerometer sensor, compass sensor, gyroscope sensor, motor load sensor, salinity sensor, vibration sensor, light sensor, radio frequency ("RF") sensor, depth sensor and auxiliary detachment sensor. Furthermore, any sensor that may be incorporated in a core device may also be incorporated into external sensor 414.

Figure 5:
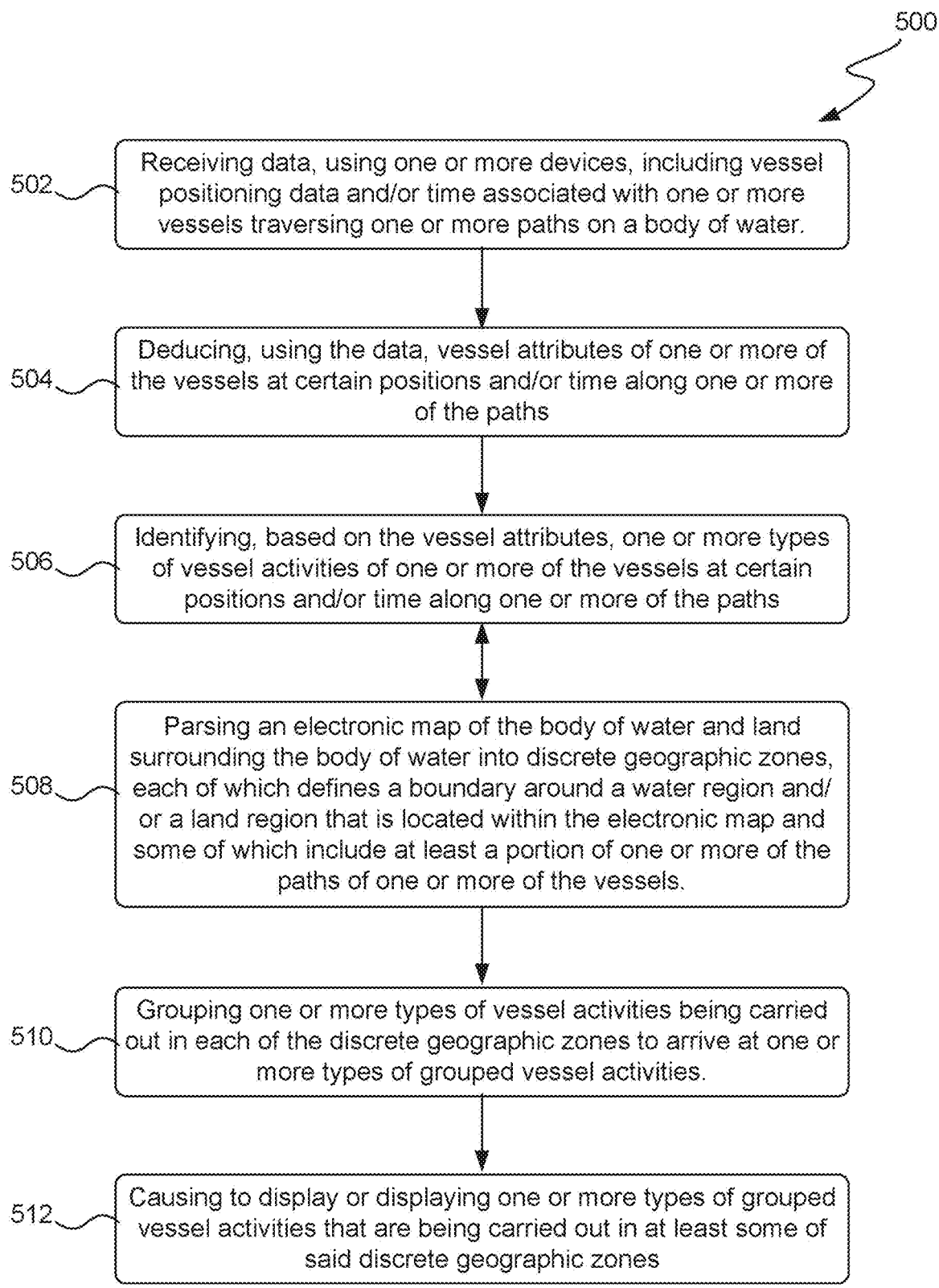
FIG. 5 shows a method of tracking vessel behavior according to one embodiment of the present teachings that may be performed by the analytics system of FIG. 1.

The present teachings offer, among other things, different methods of tracking vessel activity. FIG. 5 shows a method of tracking vessel activities, according to one embodiment of the present teachings. Method 500 includes a step 502, which includes receiving data, including vessel location and/or time data associated with one or more vessels traversing one or more paths on a body of water (e.g., ocean, lake or river). Next, a step S04 is carried out. Step 504 includes deducing, using the data (obtained from step 502), vessel attributes of one or more of the vessels at certain positions and/or times along one or more of the paths. Then, the method proceeds to step 506. This step involves identifying, based on the vessel attributes, one or more types of vessel activities of one or more of the vessels at certain positions and/or times along one or more of the paths. Following step 506, step 508 is implemented and includes parsing an electronic map of the body of water and land surrounding the body of water into discrete geographic zones. Next, a step 510 includes grouping one or more types of vessel activities being carried out in each of the discrete geographic zones to arrive at one or more types of grouped vessel activities. Process 500 then proceeds to a step 512, which includes causing to display or displaying one or more types of grouped vessel activities that are being carried out in at least some of the discrete geographic zones.

Returning to step 502, data may be received from one or multiple sources. By way of example, data may be received from a vessel or fleet management system (e.g., vessel or fleet management system 100 of FIG. 1) and/or from a source that is separate from but communicatively coupled to the vessel or fleet management system (e.g., third party data for map and/or satellite imagery, the National Oceanic and Atmospheric Administration ("NOAA") and weather service). Regardless of where the data originated, in one preferred embodiment of the present teaching, a server (e.g., server 102 of FIG. 1) receives the data.

Data received from a vessel or fleet management system, according to one embodiment of the present arrangements, may be from one or more data collection systems (e.g., data collection system 110A or 110B of FIG. 1) and/or from one or more client devices (e.g., client device 118 or 120 of FIG. 1). Data received from one or more data collection systems may be received from a core device (e.g., core devices 112A and/or 112B of FIG. 1) and/or external sensors (e.g., external sensors 114A and/or 114B of FIG. 1). The core device may provide data from a GPS receiver (e.g., GPS receiver 322) that relates to the vessel's position (e.g., a position of the vessel at particular, known time) and/or time (e.g., a time at a particular, known location), which may inform the server about the position of the vessel. The core device may also have additional sensors (e.g., additional sensors 324 of FIG. 3). As describe above in relation to FIG. 3, data may be received from at least one sensor chose from a group comprising accelerometer sensor, compass sensor, gyroscope sensor, vibration sensor, humidity sensor, salinity sensor, motor load sensor, depth sensor, pressure sensor, light sensor, solar panel irradiance sensor, battery charge sensor, altimeter sensor, Automatic Identification System ("AIS") receiver/data logger, motor-run sensor, personnel sensor, fish-hold temperature sensor, water temperature sensor, internal temperature sensor, and auxiliary detachment sensor. The data is preferably received from a core device or sensors, as described above, in a secure manner (e.g., encrypted data).

Data received from a GPS receiver, in one embodiment of the present teachings, is the velocity of the vessel, which may be associated with a given time and/or a given location. By way of example, the GPS receiver may transmit data to the memory on the core device in the following format— "2016-01-01 15:00:00 5.04 meters/second," which means at 3:00 p.m. on Jan. 1, 2016 the vessel velocity was 5.04 meters/second.

The server receives acceleration data, in one embodiment of the present teachings, from the accelerometer sensor. The acceleration data may be associated with a given time and/or location. By way of example, the server may receive data from the accelerometer sensor in the following format— "2016-01-01 15:00:00 X: 2.34 m/s$^2$, Y: 0 m/s$^2$, Z: 9.8 m/s$^2$," which means on Jan. 1, 2016 at 3:00 p.m. the acceleration of the core device was 2.34 meters/second$^2$ in the X direction (relative to the device), 0 meters/second$^2$ in the Y direction, and 9.6 meters/second$^2$ in the Z direction. By way of another example, the server may receive data from an accelerometer sensor in the following format—"2016-01-01 15:00:00 X: 0 meters/second$^2$, Y: 0 meters/second$^2$, Z: −9.8 metes/second$^2$," which means on Jan. 1, 2016 at 3:00 p.m. the vessel may have been capsized, because the acceleration due to gravity is directed towards the top of the sensor.

In another embodiment of the present teachings, the server receives geographic heading data for a particular time and/or location from a compass sensor. The geographic heading data may be in the format of "2016 01-01 15:00:00 180," means on Jan. 1, 2016 at 3 p.m. on the core device was heading 180° (i.e., South) relative to magnetic north.

The present teachings allow the server to receive data relating to angular velocity from the gyroscope sensor at a particular time and/or location, which may be in the format of "2016 01-01 15:00:00 10.3 degree/second." In other words, on Jan. 1, 2016 at 3:00 p.m. the core device was angular velocity was 10.3 degrees/second.

In certain embodiment of the present teachings, the server receives measurements relating to the vibration of the core device at a given time and/or location from a vibration sensor. The vibration sensor may measure the occurrence of vibration, vibration intensity and/or vibration frequency. By way of example the server may receive data in the form of "2016-01-01 15:00:00 10 Hertz" which means that on Jan. 1, 2016 at 3:00 p.m. the core device was vibrating at 10 Hertz.

In one embodiment of the present teachings, the server receives absolute and/or relative humidity data from a humidity sensor for a given location and/or time. The humidity sensor measures the amount of water vapor in the air inside the core device and/or the air surrounding the core device. By way of example the server may receive absolute and/or relative humidity data in the form of "2016-01-01 15:00:00 78%," which means that on Jan. 1, 2016 at 3:00 p.m. the air inside and/or surrounding the core device was an absolute and/or relative humidity of 78%.

In another embodiment of the present teachings, the server receives salinity data from a salinity sensor for a given time and/or location. The salinity sensor measures the salt concentration in a fluid. By way of example, the server may receive salinity data in the form of "2016-01-01 15:00: 00 35.5 PSU," which means that on Jan. 1, 2016 at 3:00 p.m. the salinity of the fluid in and/or surrounding the core device was 35.5 practical salinity unites ("PSU").

The server receives motor load data, according to one embodiment of the present teachings, from motor load sensor, which may measure a electrical current, voltage, rpm, and/or horsepower at a given time and/or location. By way of example, the server may receive motor load data in the form of "2016-01-01 15:00:00 5 Amps 12 Volts," which means that on Jan. 1, 2016 at 3:00 p.m. the load on the motor is measured at 5 Amps and 12 Volts.

In one embodiment of the present teachings, the server receives depth data from a depth sensor for a given time and/or location. The depth sensor measures the distance between the core device and a solid surface (e.g., the ocean floor). By way of example, the server may receive depth data in the form of "2016-01-01 15:00:00 34 meters," which means that on Jan. 1, 2016 at 3:00 p.m. the depth of the fluid between the core device and the ocean floor is 34 meters.

In another embodiment of the present teachings, for a given time and/or location the server receives light data from a light sensor, which measure the presence of and/or the strength of a light received by core device. By way of example, the server may receive light data in the form of "2016-01-01 15:00:00 1,000 lux" which means that on Jan. 1, 2016 at 3:00 p.m. the strength of the light is 1,000 lumens/meter$^2$ ("lux").

In yet another embodiment of the present teachings, the server receives data from a solar panel irradiance sensor for a given time and/or location. The solar panel irradiance sensor measures the solar irradiance on a planar surface. By way of example, the server may receive solar irradiance data in the form of "2016-01-01 15:00:00 12 Watts/meters$^2$," which means that on Jan. 1, 2016 at 3:00 p.m. the strength of the light is 12 Watts/meters$^2$.

The server receives battery charge data, according to one embodiment of the present teachings, from a battery sensor, which measures the voltage and/or % charge of the battery at a given time and/or location. By way of example, the server may receive battery charge data in the form of "2016-01-01 15:00:00 3.221 Volts," which means that on Jan. 1, 2016 at 3:00 p.m. the load on the motor is measured at 3.221 Volts.

According to one embodiment of the present teachings, the server receives data from an altimeter sensor for a given time and/or location. The altimeter sensor measures the altitude of the core device. The server may receive altitude data in the form of "2016-01-01 15:00:00 1.6 meters," which means that on Jan. 1, 2016 at 3:00 p.m. the altitude of the core device is 1.6 meters.

In another embodiment of the present teachings, the server may receive data from an AIS receiver/data logger for a given time and/or location. The AIS receiver/data logger measures the presence, contents, intensity and/or location of AIS signal. By way of example, the server may receive AIS receiver/data logger in the form of "2016-01-01 11:30:00 !AIVDM, 1,1,A,13HOI:0P0000VOHLCnHQKwvL05Ip, 0*23," which means that on Jan. 1, 2016 at 11:30 a.m. Coordinated Universal Time ("UTC"). User ID 227006760 is at 49.4755767° N, 0.1313800° W and has a rate-of-turn of −128°/min.

In another embodiment of the present teachings, the server receives data from a fish-hold temperature sensor for a given time and/or location. The fish-hold temperature sensor measures the temperature within one or more holds where fish or other catch is stored. The server may receive altitude data in the form of "2016-01-01 15:00:00 2.3° Celcius," which means that on Jan. 1, 2016 at 3:00 p.m. the temperature in the fish-hold is 2.3° Celcius.

In yet another embodiment of the present teachings, the server receives data from a water temperature sensor for a given time and/or location. The water temperature sensor measures the temperature of the water surrounding the core device (e.g., the water temperature surrounding the vessel on which the core device is attached). The server may receive water temperature data in the form of "2016-01-01 15:00:00 23° Celcius," which means that on Jan. 1, 2016 at 3:00 p.m. the temperature in the water surrounding the core device is 23° Celcius.

According to yet another embodiment of the present teachings, the server receives data from an internal temperature sensor for a given time and/or location. The internal temperature sensor measures the temperature inside the core device. The server may receive internal temperature data in the form of "2016-01-01 15:00:00 65° Celcius," which means that on Jan. 1, 2016 at 3:00 p.m. the internal temperature of the core device is 65° Celcius.

The server receives auxiliary detachment data for a particular time and/or location, according to one embodiment of the present teachings, from a gear deployment sensor. The gear deployment sensor determines when auxiliary equipment (e.g., fishing gear) is in/out of the water or is deployed on/off a vessel or location. By way of example, the server may receive gear deployment data in the form of "2016-01-01 15:00:00 Entered Water; 2016-01-01 17:00:00 Exited Water," which means that on Jan. 1, 2016 at 3:00 p.m. the gear entered the water and at 5:00 p.m. the gear exited the water.

The server may receive data from the GPS receiver and/or additional sensor discussed above using the core device's data upload radio (e.g., data upload radio 326 of FIG. 3). In another embodiment of the present arrangements, the GPS receiver and/or additional sensor data may be transmitted to another core device (e.g., core device 112B of FIG. 1) and then transmitted to the server using the data upload radio on that core device.

The data collection system's external sensors (e.g., external sensors 1114A and/or 114B) may also transmit data to the core device, and ultimately, to the server. As described in relation to FIG. 4, data may be received from at least one sensor chose from a group comprising motor-run sensor, personnel sensor, fish-hold temperature sensor, water temperature sensor, accelerometer sensor, compass sensor, gyroscope sensor, motor load sensor, salinity sensor, vibration sensor, light sensor, RF sensor, depth sensor, and auxiliary detachment sensor. The server receives data from an external sensor in a format that is substantially similar to the data the server receives from an equivalent sensor in the core device. By way of example, the data received by an external water temperature sensor is in substantially the same format as the data received from a water temperature sensor located in the core device. Preferably, the data received from external and internal sensors is secure (e.g., encrypted data).

The external sensors may include sensors that are not in the core device. By way of example, an external sensor may include a personnel sensor. For a particular time and/or location, the personnel sensor may identify a person on the vessel, determine the presence of the person and/or determine time when a person enters and/or exists the vessel. By way of example, the server may receive data in the form of "2016-01-01 15:00:00 Person 1234 Boarded Vessel," which means that on Jan. 1, 2016 at 3:00 p.m. a person with identification number 1234 boarded the vessel.

The external sensors, using the external sensor's inter-device radio (e.g., inter-device radio 424 of FIG. 4A), transmit sensor data to the core device and/or another core device (e.g., core device 112B of FIG. 1). A vessel network (e.g., vessel network 116 of FIG. 1) provides a network between which the external sensors communicate with either core device.

In addition to data received from the data collection system (e.g., data from the core device and external sensors), the server may also receive data may from one or more client devices. By way of example, the server may receive data related to a vessel or a fleet of vessels that a user, using the client device, manages. Data associated with a vessel may be chosen form a group comprising known vessel locations, vessel size, vessel personnel capacity, vessel cargo capacity, vessel target species, vessel onboard gear, vessel engine size, vessel fuel take size, vessel infractions, vessel license, vessel legal restrictions and previous vessel trips. The user inputs the vessel related data into the client device, for example, when core device is installed on a vessel, and the server receives the data through a network (e.g., network 104 of FIG. 1).

Known vessel locations, according to one embodiment of the present teachings, are known geographic locations (e.g., docks or fueling stations) that a user inputs at the time a core device is installed. Vessel size relates to the length, tonnage, and/or draft of the vessel. Vessel personnel related to the number of people that are allowed on a particular type of boat. Vessel engine type relates to the size, type, brand, fuel type, efficiency, and/or power of the motor(s) on a particular vessel. Vessel cargo capacity relate to the amount of aquatic species (e.g., fish) the vessel can carry in any given trip. Vessel target species relates to the type(s) of aquatic species the vessel is designed to harvest and/or will harvest. The vessel onboard gear relates to the type(s) of gear (e.g., trawl net) present on the vessel, the type of gear used on a particular vessel type, and/or the gear typically used by the vessel's operators. The vessel license refers to the type(s) of aquatic species the vessel is licensed to harvest (e.g., the vessel can only harvest cod) and/or particular location(s) the vessel is licensed to harvest one or more aquatic species (e.g., the vessel can only harvest a species at a location that is more than five miles from shore). Vessel legal restrictions relate to seasonal harvesting restrictions, spatial restrictions, time restrictions, and/or species restrictions implemented by local, regional or federal agencies. Vessel infractions relates to prior vessel infraction for violating rules implemented by local, regional or federal agencies.

As discussed above, in one embodiment of the present teachings, data may also be received from a source that is separate from but commutatively coupled to the vessel or fleet management system. Data received may be any data that informs on vessel location and/or time data. By way of example, data received from a source separate from the vessel or fleet management system may be a data type chosen from a group comprising vessel elevation, depth of water, water surface temperature, chlorophyll content, ocean color, wave height, weather, wind speed, air temperature, cloud cover, sun rise, sun set, and tides.

Figure 6:
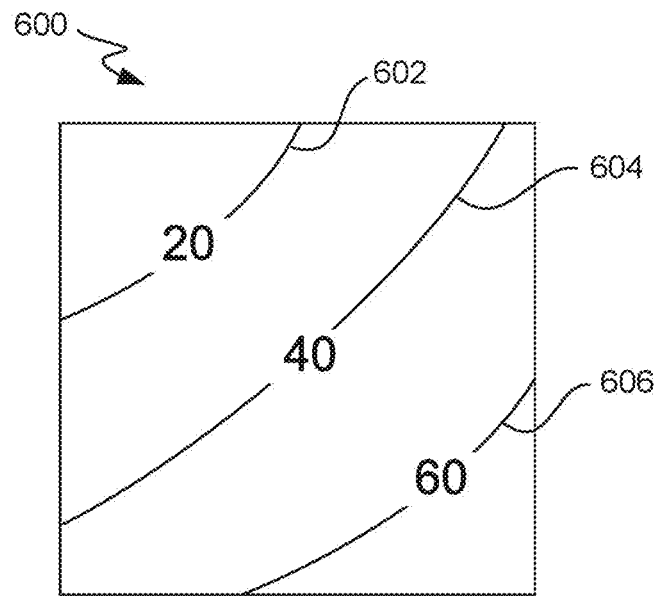
FIG. 6 shows a visual representation of bathometry data, according to one embodiment of the present teachings and that is received by the analytics system of FIG. 1.

FIG. 6 shows a visual representation of bathymetry data 600 that may be received by the vessel or fleet management system to determine water depth. The bathymetry data may be received from a third party such as, for example, the NOAA. Bathymetric data 600 may be received relative to a particular known region and/or location (e.g., harbor, coastline, geographic region, municipality, nation, or body of water) that a vessel and/or vessels are located. As shown in FIG. 6, according to one embodiment of the present arrangements, bathymetry data 600 includes a first depth 602 of 20 meters, a second depth 604 of 40 meters, and a third depth 606 of 60 meters for a particular region. Bathymetry data 600 shows a sloping area (e.g., an ocean floor) that slopes (i.e., the water becomes deeper) as a vessel move radially outward from an origin, which, for example, may be a location on land.

The deducing step 504 includes deducing vessel attributes, using one or more data types from step 502, at a certain position and/or time along the vessel's path. By way of example, vessel attributes may be chosen from a group including the position and/or orientation relative to certain predefined locations, regulatory requirements at a location proximate to the vessel, geographic information and/or environmental conditions at a location proximate to the vessel, vessel velocity and/or acceleration, vessel turn angle and geometry of the vessel path.

In one embodiment of the present teachings, vessel position and/or orientation relative to a known predefined location may be deduced by receiving data relating to a certain predefined location (e.g., receiving a map data of a coastline) and vessel location data (e.g., receiving vessel position from the core device GPS). Using the map data of the coastline and the position of the vessel, the server can deduce the vessel position relative to the coastline. By way of example, the server may deduce that the vessel is 100 meters from the coastline.

The server deduces the vessel attribute of velocity, in one embodiment of the present teachings, by receiving data relating to a vessel's location at a particular time and receiving data relating to the vessel's location immediately preceding the first time. By way of example, the server may receive the vessel's current location and time from the GPS receiver. The server also receives, from memory, the vessel's previously measured location at a previous time. The server may deduce the vessel velocity by dividing the time it took the vessel to travel between the two locations by the distance between the two locations.

The server deduces the vessel attribute of acceleration, in one embodiment of the present teachings, by receiving data relating to a vessel's velocity at a particular time and/or location and receiving data relating to the vessel's velocity immediately preceding the first time and/or location. By way of example, the server may receive the vessel's current velocity and time and/or location from the GPS receiver. The server also receives, from memory, the vessel's previously measured velocity at a previous time and/or location. From this data, the server may deduce the vessel acceleration by dividing the difference in velocity between the two times and/or locations by the difference in time between the two velocity measurements (i.e., $a=((v_2-v_r)/(t_2-t_1))$).

In one embodiment of the present teachings, the server deduces the vessel attribute of turn angle (hereinafter also referred to as "heading variance) by receiving data relating to the vessels heading at a particular time and/or location and receiving data relating to the vessel heading at a prior time and/or location. By way of example, the server may receive a heading measurement from a compass sensor located on the vessel's core device. In addition, the server may receive, from memory, the vessel's measured heading immediately preceding the heading measurement from the compass sensor. From these data sets, the server may deduce the heading variance by determining the change in angle between the two heading measurements. Turn angle may also be presented as a percentage, which represents the percent change in heading between two points.

I In another embodiment of the present teachings, the server deduces the geometry, or shape, of a vessel path. As will be discussed in greater detail below in relation to FIG. 8, the server breaks up a vessel path into one or more vessel segment representations. Each segment representation shares similar vessel attributes (e.g., similar headings or velocity).

The server may also deduce regulatory requirements, geographic information and/or environmental conditions at a location proximate to and/or within a certain radius of a vessel.

The server, in one embodiment of the present teachings, receives data relating to the vessel's location and data relating to regulatory requirements (e.g., type of species the vessels is or is not licensed to harvest, geographic locations the vessel type is permitted to harvest, and/or time in which harvesting is permitted), geographic information (e.g., water depth, topography below the water, type of marine ecosystem habitat), and/or environmental conditions (e.g., weather conditions, tides, chlorophyll content, currents and wave height). By way of example, the server may deduce that the topography of the ocean floor is flat in the location proximate to and/or within a certain radius of the vessel. In another example, the server may deduce that the vessel based on the vessel location, the vessel is not permitted to harvest a particular type of species (e.g., blue fin tuna fish). In yet another example, the server may deduce that weather is 70 degrees with no wind in the location proximate to and/or within a certain radius of the vessel.

Figure 7:
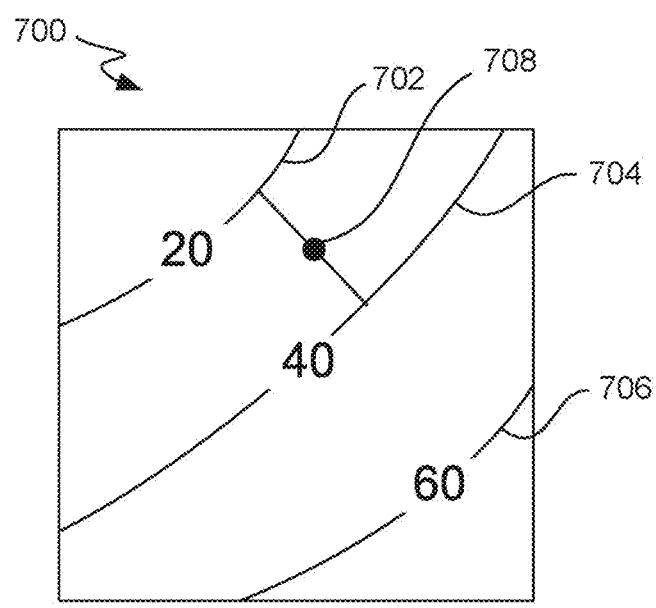
FIG. 7 shows the bathometry data of FIG. 6 and a vessel position, according to one embodiment of the present teachings and that is received by the analytics system of FIG. 1.

In another embodiment of the present teachings, bathymetry data, received from a third party, and the vessel's location, received from a GPS receiver (e.g., GPS receiver 323 of FIG. 3) on the vessel, may be used to deduce the water depth proximate to and/or within a certain radius of the vessel. FIG. 7 shows bathymetry data 700 having a first depth 702, a second depth 704, and a third depth 706, which are substantially similar to their counterparts in FIG. 6, i.e., first depth 602, second depth 604, and third depth 606. FIG. 7 also shows a vessel location 708 received, for example, by a GPS receiver. From the bathometry data 700 and vessel location 706, a server (e.g., server 102 of FIG. 1) may be used to deduce the depth of the water proximate to vessel location 706. By way of example, the server may determine that vessel location 708 is half way between first depth 702 and second depth 704. Thus, the server may deduce that the water depth of vessel location 708 is 30 meters, (i.e., half way between 20 meters and 40 meters).

In one embodiment, step 506 of the present teachings identifies one or more types of vessel activities along one or more vessel paths. A vessel activity includes at least one activity chose from a group comprising driving, gear-disposition (e.g., gear-setting and/or gear-retrieval), fishing, drifting, and idling. Driving activities may include but are not limited to steaming, transiting, and sailing. Gear-disposition activities may include but are not limited to gear setting, gear pulling, and gear searching. Fishing activities may include, but are not limited to activity related to harvesting a marine species such as bottom trawling, dredging, gillnetting, jigging, long lining, trolling, and trapping or potting. Drifting activities may include, but are not limited to trans-shipping (e.g., moving cargo from one boat to another).

Idling activities may include, but are not limited to refueling, anchoring, recreational activities (e.g., snorkeling and diving), docking, parking, buying and selling goods.

During step 506, at each location and/or time along one or more vessel paths, the server may identify a vessel activity using one or more of the vessel attributes from step 504. By way of example, the server, in one embodiment of the present teachings, identifies one or more vessel activities by using a hidden markov model (hereinafter also referred to as "HM model"). In another embodiment of the present teachings, the server identifies one or more vessel activities by deducing a one or more vessel attribute and/or vessel attribute patterns along the vessel path and then matching each vessel attribute or vessel attribute pattern to a vessel activity. In yet another embodiment of the present teachings, the server identifies one or more vessel activities using a statistical algorithm.

When using a statistical algorithm to identify a vessel activity, the server receives all the vessel attributes for a location and/or time and identifies an activity with the highest probability of occurring based on those vessel attributes. By way of example, a vessel activity for a location and/or time may be identified as driving if the velocity of the vessel is greater than about 5 meters/second and the vessel acceleration is less than about 1 meter/second$^2$.

The vessel activity of idling for a location and/or time, in one example, is identified if:
  The vessel location is within about 200 meters of a shoreline;
  The vessel has an instantaneous speed of less than about 1 meters/second; and
  The vessel has remained within a radius of about 10 meters from preceding measured vessel locations for duration of about 10 minutes or more.

The vessel activity of drifting, in another example, is identified if:
  The vessel velocity is less than about 2 meters/second; and
  The vessel heading is within about 15° of the direction of the water current proximate to the vessel location.

The vessel activity of gear-disposition, in yet another example, is identified if:
  The vessel has velocity that is less than about 0.5 meters/second
  Previously measured velocity is less than about 0.5 meters/second for a duration that is greater than about 5 minutes and less than about 20 minutes;
  The vessel's change in heading is less than about 10% of previously measured heading measurement; and
  The vessel velocity of the next vessel location and/or time is greater than about 2 meters/s.

The vessel activity of fishing, in yet another example, is identified if:
  The vessel velocity is less than about 2.5 meters/second;
  The vessel's gear deployment sensor transmitted that gear has been deployed (e.g., "2016-01-01 15:00:00 Entered Water)."

In one embodiment of the present teachings, the statistical algorithm used may vary depending on the vessel type. In one embodiment of the present teachings, the vessel size and/or the vessel engine size of the vessel being analyzed may change the vessel attributes values that are used in the statistical algorithm to determine the vessel activities. In identifying the activity of driving, by way of example, a vessel with a small engine (e.g., 10 horsepower) may only be able travel at low velocities. The statistical algorithm for this vessel type may, therefore, be designed to more accurately identify a lower velocity threshold value (e.g., greater than about 3 meters/second but less than about 5 meters/second). A boat with a larger engine (e.g., 50 horsepower), on the other hand, may be capable of higher velocities. The statistical algorithm for this vessel type may be designed to more accurately identify a higher velocity threshold value (e.g., greater than about 5 meters/second).

In another embodiment of the present teachings, a server uses an HM model to determine the probability of an activity occurring or not occurring based on one or more of the vessel attributes at a particular location and/or time. In building the HM Model, a human expert may first identify an activity at one or more vessel locations and/or times. By way of example, the expert may identify an activity by examining one or more of the vessel attributes at a particular vessel location and/or time. Specifically, the expert may examine at least one of vessel attribute values, discernible patterns of vessel attributes or identify a dominant or sub-dominant vessel attributes and then based on such knowledge of vessel attributes, identify probability of one or more vessel activities. In another example, the expert may have knowledge regarding a particular vessel activity because the expert knew when and/or where certain activities took place during the path of the vessel (e.g., the expert was in communication with the vessel or was on the vessel), and then develop a correlation between the known activity or activities and the various vessel attributes identified in step 504. The correlation allows the HM model to provide information regarding the probability of occurrence of certain vessel activities based on the identified vessel attributes.

The expert with knowledge of vessel activities and/or vessel attributes classifies those vessel activities and/or attributes for at least some of the vessel locations and/or times and provides them to a server module to create the HM model. With the HM model in place, new or subsequent vessel attributes for a particular vessel location and/or time received at the server are entered into the HM model. The HM model then analyzes one or more of such new or subsequent vessel attributes at various vessel locations and/or times and assigns a probability of occurrence (reported in percentage value that is relative to the occurrence of all other possible vessel activities).

By way of example, the gear-disposition activity, such gear deployment, may be associated with three vessel attributes, i.e., depth of the water, time of day, and speed of the vessel. An expert determines whether gear deployment is occurring or not occurring for certain vessel locations and/or times by examining values of these vessel attributes. Information regarding gear deployment and values of the vessel attributes (e.g., depth of the water, time of day, and speed of the vessel) are input into the HM model to build a correlation between vessel attributes and vessel activities. For at least some new vessel locations and/or times, new values are fed into the HM model to arrive at a probability of occurrence of gear deployment.

As mentioned above, in another embodiment of the present teachings, the server may identify one or more vessel activities by matching or developing a correlation for a vessel attribute and/or vessel attribute pattern to a vessel activity. Stated in another way, the server first deduces one or more vessel attributes and/or vessel attribute patterns along one or more locations and/or times of the vessel path. Then the server matches one or more of the vessel attributes or vessel attributes patterns to a vessel activity. In one embodiment of the present teachings, one or more of the vessel attributes or vessel attribute patterns is deduced for a single location and/or time. In another embodiment of the present teachings, one or more of the vessel attributes or vessel attribute patterns is deduced for a group of locations and/or time. Thus, the identified vessel activity (from the deduced vessel attributes or vessel attribute patterns) may be for a single location and/or time or a collection of vessel locations and/or times (hereafter also referred to as a "sub-path").

Figure 8:
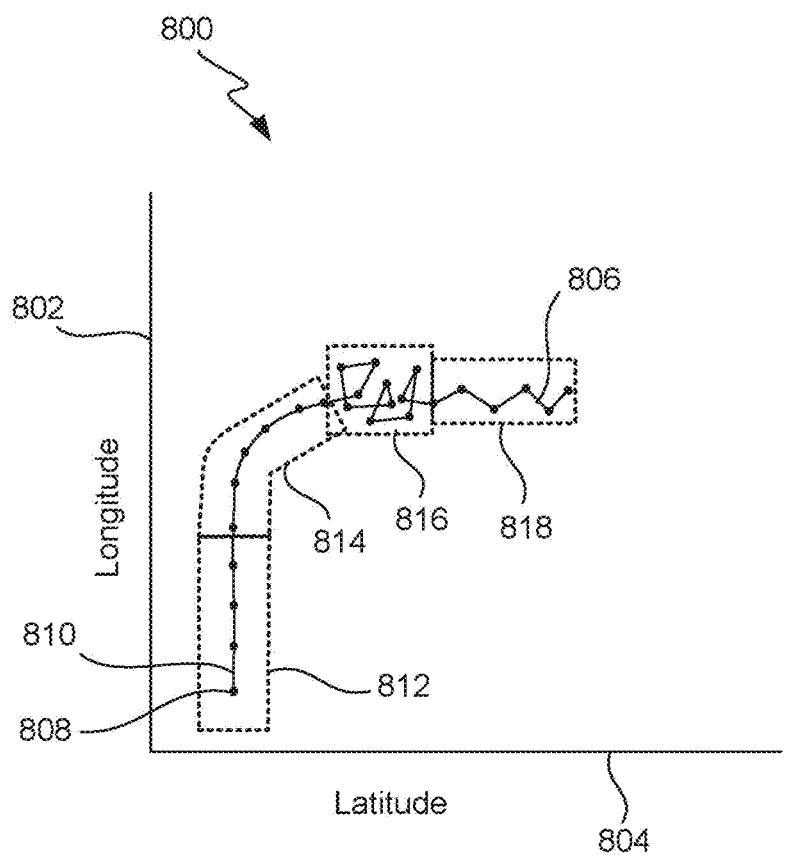
FIG. 8 shows vessel path, according to one embodiment of the present teachings and that includes multiple sub-paths, each of which is associated with a vessel activity.

To deduce one or more vessel attributes and/or vessel attribute patterns along a vessel path, the server, by way of example, identifies one or more vessel sub-paths, each of which may include a collection of one or more segment representations. Each segment representation includes start time position data and end time position data. Furthermore, each segment representation may include one or more vessel attributes. FIG. 8 shows a map 800 with multiple segment representations 810. In addition, map 800 provides a longitude 802 and latitude 804 to locate a vessel path 806 in space and one or more vessel datum 808, each of which provide vessel location information and/or time along vessel path 806. Each segment representation 810 includes two datum 808, i.e., a start vessel location data and an end vessel location data. Preferably, segment representation 810 connects two datum 808 chronologically adjacent to each other (i.e., there is no vessel data, measured by time, between two vessel datum that create a segment representation 810). One or more vessel attributes may also be deduced from each segment representation 810 and vessel datum 808 within each segment representation 810. For example, vessel heading, vessel velocity and a duration of time it took for the vessel to travel the length of segment representation 810 may be determined.

Segment representations 810 that have similar quantifiable and/or qualifiable vessel attributes an/or vessel attribute patterns are collected form one or more vessel sub-paths. In the embodiment shown in FIG. 8, multiple segment representations 810 that have quantifiable or qualifiable patterns of variance in heading are grouped together to form vessel sub-paths. By way of example, a first heading sub-path 812 includes three segment representations 810. Each segment representation 810 has a heading value that is substantially the same (i.e., each vessel path segment 180 is positioned at about 90 degrees). An addition, a heading variance—or heading change—between each segment is similar (e.g., the heading variance is less than about 2 degrees). Thus, three segment representations 808 are grouped together to form first heading sub-path 812.

A second heading sub-path 814 includes five segment representations 808. Each segment representation 808 has a different heading, however, the heading variance between each vessel path segment is substantially similar (e.g., the heading variance is about 3 degree). In this manner, second heading sub-path 814 appears as a uniform curve. Third heading sub-path 816 includes twelve section representations 808, with each segment representation 808 having a different heading and heading variance. As shown in FIG. 8, vessel path 806 in third heading sub-section 816 is not uniform. A fourth heading sub-path 818, which includes five segment representations 808, provides a vessel path with an identifiable zig-zag pattern. The first, third and fifth vessel path segments 808 have substantially similar heading and heading variance and the second and fourth vessel path segment have a substantially similar heading and heading variance.

In one embodiment of the present teachings, first heading sub-path 812, second heading sub-path 814, third heading sub-path 816, and fourth heading sub-path 818 correspond to a known vessel activity. By way of example, vessel path 806 in first heading sub-path 812 may be identified with driving and in second heading sub-path 814, vessel path 806 may be identified with drifting. Vessel path 806 in third heading sub-path 816, on the other hand, may be identified with gear-disposition and in fourth heading sub-path 818 vessel path 806 may have a path associated with fishing.

In another embodiment of the present teachings, one or more attributes of a heading sub-path may be used to identify a vessel activity. By way of example, each datum 806 and segment representation 810 within first heading sub-path 812 may be used to deduce one or more vessel attributes such as vessel heading, vessel velocity and duration of time it took for the vessel to travel the length of the first heading sub-path 812 may be determined. From this information, known vessel activities may be identified.

Figure 9:
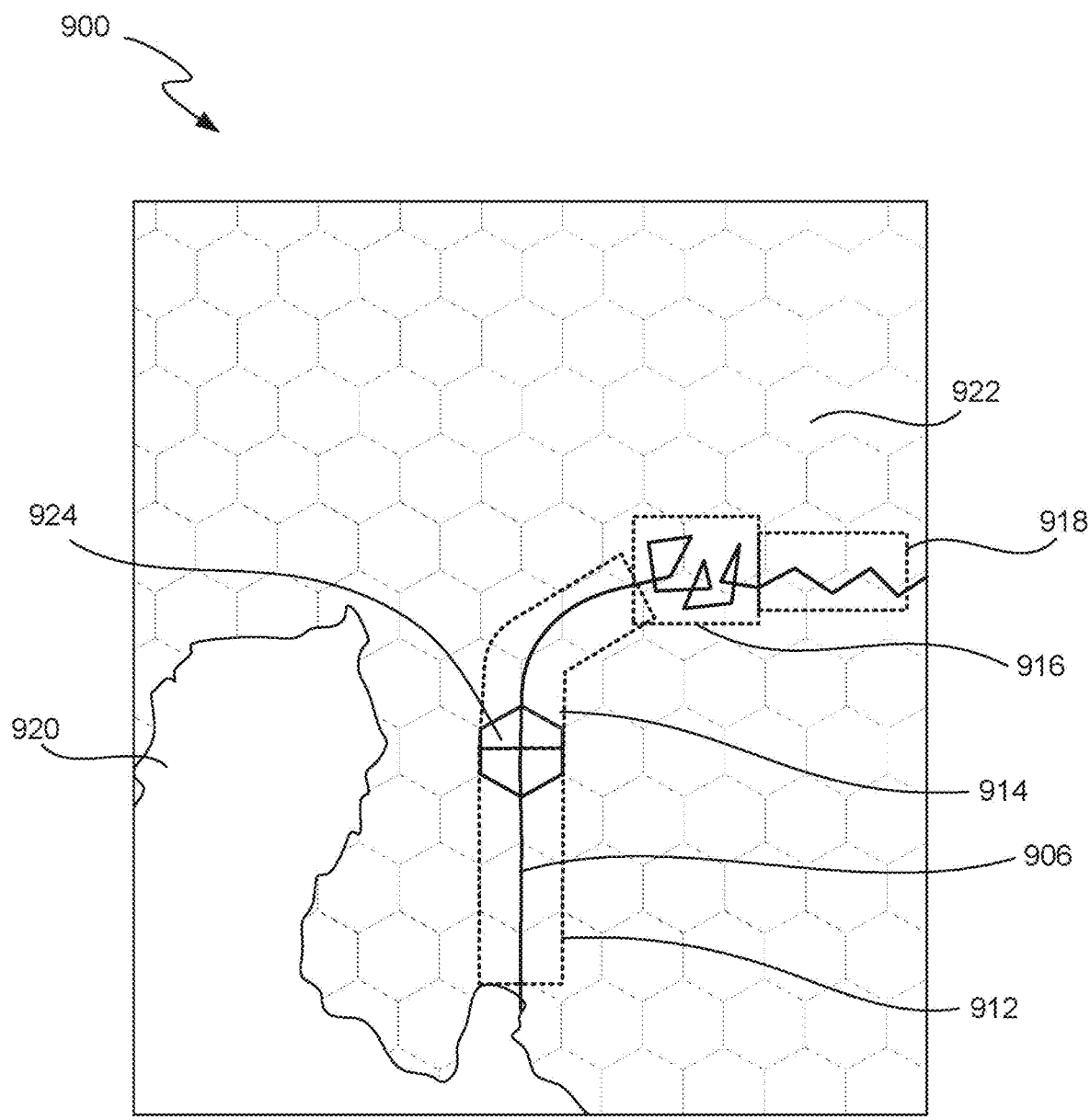
FIG. 9 shows a map, according to one embodiment of the present teachings and that has a water body parsed into multiple discrete geographic zones and that depicts the vessel path and sub-paths of FIG. 8.

In one embodiment, a step 508 of the present teachings includes parsing a map into one or more discrete geographic zones. Each discrete geographic zone defines a boundary around a water region and/or a land region that is located within the electronic map. Furthermore, some of the discrete geographic zones include at least a portion of one or more of the paths of one or more vessels. As shown in FIG. 9, a map 900 includes both land 920 and a body of water 922. In this embodiment of the present teachings, body of water 922 is parsed into one or more discrete geographic zones 924. In addition, map 900 further includes vessel path 906, first heading sub-path 912, second heading sub-path 914, third heading sub-path 916, and forth heading sub-path 918, which are substantially similar to their counterparts in FIG. 8, i.e., vessel path 806, first heading sub-path 812, second heading sub-path 814, third heading sub-path 816, and forth heading sub-path 818). Vessel path 906 passes through at least a portion of one or more discrete geographic zones 924.

Figure 10:
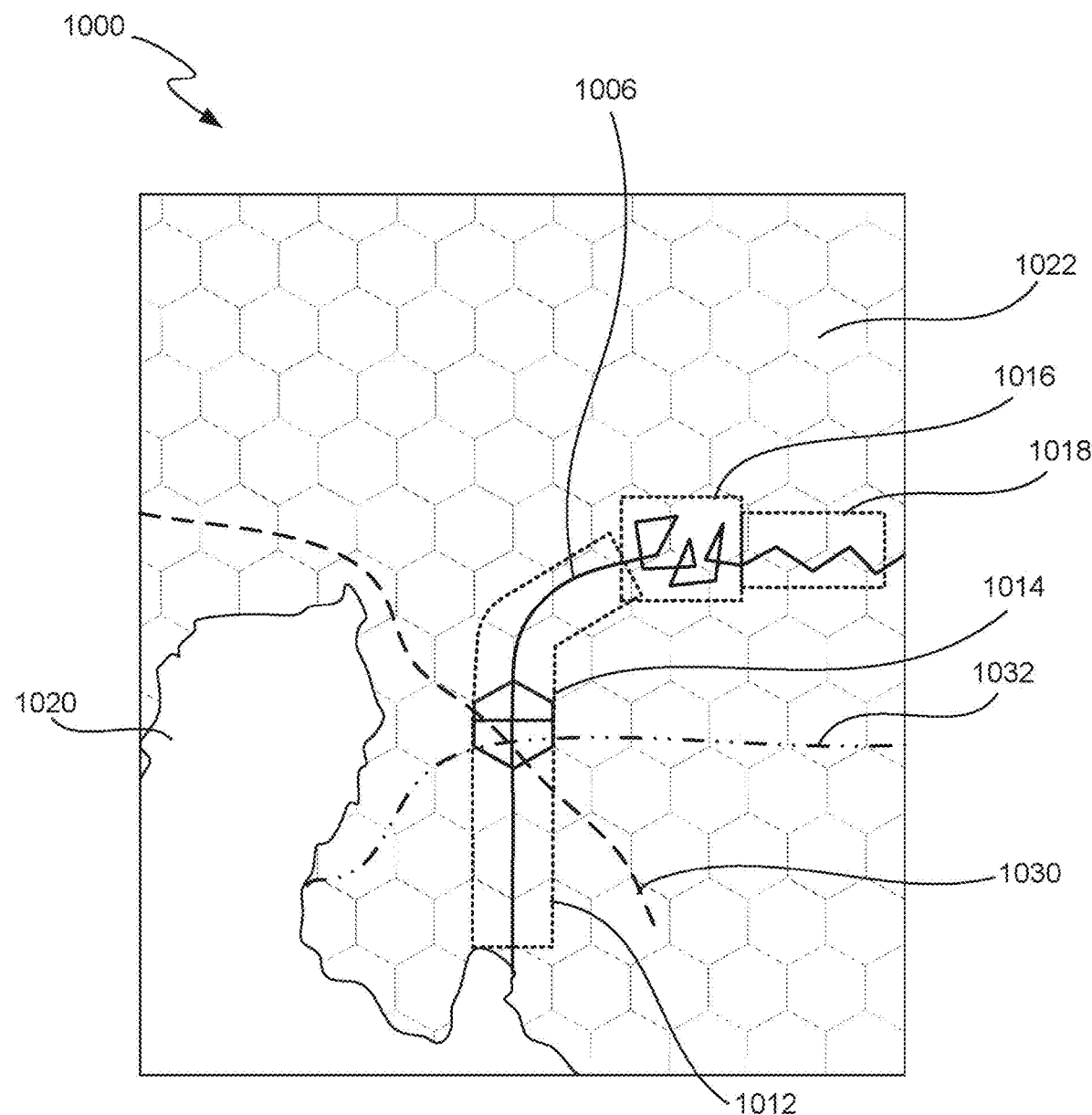
FIG. 10 shows the map of FIG. 9, according to one embodiment of the present teachings and that includes additional vessel paths.

FIG. 10 shows a map 1000 having multiple vessel paths—i.e., a first vessel path 1006, a second vessel path 1030, and a third vessel path 1032—traversing through a body of water 1022. Map 1000, includes a first vessel path 1006, first heading sub-path 1012, second heading sub-path 1014, third heading sub-path 1016, and forth heading sub-path 1018, land 1020, a body of water 1022, and a discrete geographic zone 1024 which are substantially similar to their counterparts in FIG. 9 (i.e., vessel path 906, first heading sub-path 912, second heading section 914, third heading sub-path 916, and forth heading sub-path 918, land 920, a body of water 922, and discrete geographic zone 924 of FIG. 9). First vessel path 1006, second vessel path 1030, and third vessel path 1032 may be from the same or different vessels. In one embodiment of the present teachings, when vessel paths are from a single vessel, one or more vessel activities may be identified during multiple vessel paths or trips. In this manner, information relating to the vessel's vessel activities can be analyzed over a period time for a particular geographic zone. As will be discussed in greater detail below, vessel activities may inform in which discrete geographic zones 1024 the vessel performs certain vessel activities (e.g., fishing) during multiple vessel paths.

In another embodiment of the present teachings, first vessel path 1006, second vessel path 1030, and third vessel path 1032 are vessel paths from multiple vessels. Map 1000 provides information relating to vessel activities within the geography of map 1000. In this manner and as will be described in greater detail below, map 1000 shows in what geographic zones 1024, multiple vessels perform certain vessel activities (e.g., gear-disposition).

Figure 11:
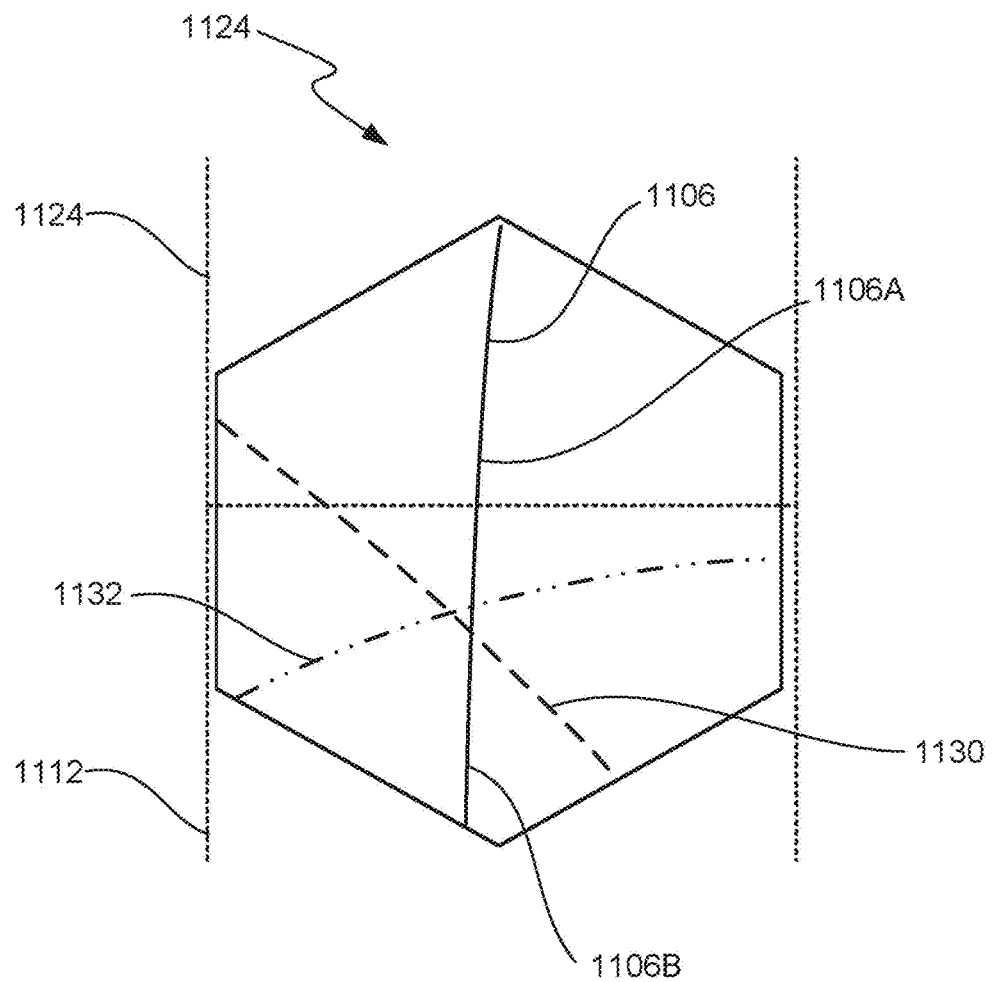
FIG. 11 shows an exemplar discrete geographic zone of FIG. 10 and that has traversing through it three vessel paths.

FIG. 11 shows a discrete geographic zone 1124, according to one embodiment of the present teachings and that has multiple vessel paths. Discrete geographic zone 1124, first vessel path 1106, first heading sub-path 1112, second heading sub-path 1114, second vessel path 1130, third vessel path 1132 of FIG. 11 are substantially similar to their counterparts in FIG. 10, i.e., discrete geographic zone 1024, first vessel path 1006, first heading sub-path 1012, second heading sub-path 1014, second vessel path 1030 and third vessel path 1032.

As discussed above, each vessel path may also be associated with one or more vessel activities. According to FIG. 11, first vessel path 1106, includes a first vessel path portion 1106A and a second vessel path portion 1106B. First vessel path portion 1106A is located within first heading section 1112 and, as discussed in relation to FIG. 8, is associated with the vessel activity of driving. Second vessel path portion 110B is located with second heading section 1114, and is associated with the vessel activity of drifting.

Similarly, second vessel path 1130 and third vessel path 1132 that passes through discrete geographic zone 1124 are each associated with a vessel activity. In this exemplar embodiment, second vessel path 1130 in discrete geographic zone 1124 is associated with the vessel activity of driving. Third vessel path 1132 in discrete geographic zone 1124 is associated with the vessel activity of fishing. The vessel activity of second vessel path 1130 and third vessel path 1132 may be determined using any of the exemplar methods described in relation to step 506.

A grouping vessel activities step 510 includes grouping vessel activities carried out within a discrete geographic zone to create one or more grouped vessel activities. FIG. 12 shows an electronic table 1200, according to one embodiment of the present teachings and that includes one or more discrete geographic zones 1202, one or more grouped vessel activities 1210 within each discrete geographic zone, and a vessel activity quantity 1220 for each grouped vessel activity. By way of example, electronic table 1200 includes discrete geographic zone 1124 of FIG. 11 and the vessel activities that occurred within it. Within discrete geographic zone 1124, there were two driving activities (e.g., first vessel path portion 1106B and second vessel path 1130 of FIG. 1), one drifting activity (e.g., second vessel path portion 110B of FIG. 11), and one fishing activity (e.g., third vessel path 1132 of FIG. 11). While electronic table 1200 shows just one discrete geographic zone (i.e., discrete geographic zone 1124 of FIG. 11), electronic table 1200 may include some or all of the geographic zones on a map (e.g., map 900 of FIG. 9 and/or map 1000 of FIG. 10).

In another embodiment of the present teachings, a vessel activity score 1240 is calculated for each grouped vessel activity that is carried out in a discrete geographic zone. In this embodiment, a numerical value (hereafter also referred to as a "activity weight") 1230 is assigned to each grouped vessel activity. Certain vessel activities may receive a higher activity weight if the vessel activity is determined to be an important activity within a certain geographic area. By way of example, if a government agency concerned about over-fishing on an offshore reef, the government agency may place a higher activity weight on the vessel activity of fishing (e.g., an activity weight of 4) and a lower vessel weight on the vessel activity of driving (e.g., an activity weight of 1) and/or drifting (e.g., an activity weight of 2).

Vessel activity score 1240 for each vessel activity is calculated by multiplying vessel activity quantity 1220 by activity weight 1230. In the exemplar electronic table 1200, the activity score for fishing (hereinafter also referred to as a "fishing pressure score") in discrete geographic zone 1124 is calculated by multiplying the vessel activity quantity for fishing (i.e., 2) by the activity weight for fishing (i.e., 4). Thus, the fishing pressure score is 8 (i.e., 2*4=8). Using the same calculation, driving has an activity score of 2 (i.e., 2*1=2), and drifting has an activity score of 1 (i.e., 1*1=1).

In yet another embodiment of the present teachings, a score 1250 (hereinafter also referred to as "geographic zone score") is calculated for each discrete geographic zone. The geographic zone score is a numerical value that incorporates all vessel activity scores within a discrete geographic zone. A geographic zone score 1250, by way of example, is the sum of vessel activity scores within a discrete geographic zone divided the sum by the total quantity of activities carried out in the discrete geographic zone. Continuing with the example above, the vessel activity scores (e.g., the fishing activity score of 8, the drifting activity score of 2, and the driving activity score of 1) within discrete geographic zone 1124 are added together for a value of 8 (e.g., 8+2+1=11). Next, the total quantity of activities carried out in discrete geographic zone 1124 is determined. As shown in electronic table 1200, discrete geographic zone 1124 includes 5 vessel activities (e.g., 2 fishing activities, 1 drifting activity, and 1 driving activity). Finally, the sum of vessel activity scores is divided by the total quantity of activities carried out in the discrete geographic zone generates a value of 2.2 (i.e., 11/5=2.2). Thus, discrete geographic zone 1124 has a geographic zone score of 2.2. A geographic zone score for each discrete geographic zone may be calculated in a similar manner.

In one embodiment, step 512 of the present teachings displays or causes to display one or more of the grouped vessel activities of step 510. The grouped vessel activities may be displayed in a table format, such as electronic table 1200 of FIG. 12. In a preferred embodiment of the present teachings, the grouped vessel activities are displayed on a map that includes one or more discrete geographic zones (e.g., discrete geographic zones 922 of FIG. 9). Each discrete geographic zone may display the entire grouped vessel activities identified in the discrete geographic zone or a single grouped vessel activity—e.g., the grouped vessel activity with the highest vessel activity quantity.

The present teachings recognize that the map and/or table may be displayed on any display interface (e.g. display interface 236 of FIG. 2) of server (e.g., server 102 of FIG. 1) or a client device (e.g., client device 118 and/or 120). Furthermore, the server may also transmit information to a computing device that is separate from but commutatively coupled to the vessel or fleet management system. The display interface may be on board a vessel or off board the vessel.

In another embodiment of the present teachings, the server displays or causes to be displayed one or more vessel paths of one or more vessels (e.g., first vessel path 1006, second vessel path 1030 and/or third vessel path 1032 of FIG. 10), one or more vessel activity quantities 1220, one or more vessel activity scores 1240, and/or geographic zone score 1250.

Figure 13:
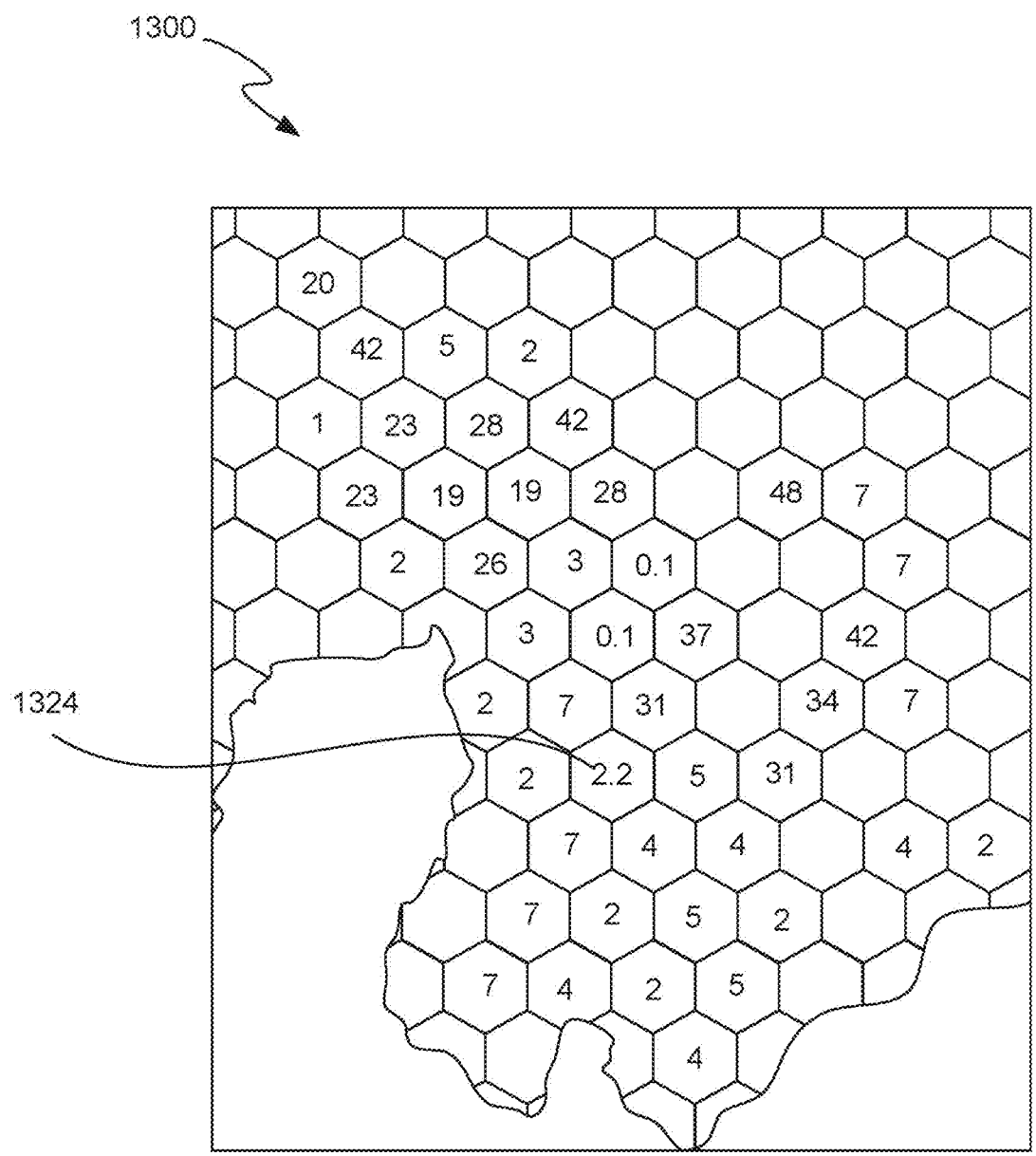
FIG. 13 shows a visual representation of the map of FIG. 9 that provides geographic zone score for certain discrete geographic zones.

FIG. 13, by way of example, shows a displayed map 1300 that includes multiple discrete geographic zones, each of which has a geographic zone score. Displayed map 1300 is substantially similar to map 1000 of FIG. 10. Displayed map 1300 includes distinct geographic zones 1324, which are substantially similar to discrete geographic zones 1124 of FIG. 11. The geographic zone score for each discrete geographic zone 1324 may be retrieved from an electronic table (e.g., electronic table 1200 of FIG. 12) and displayed in each corresponding discrete geographic zone 1324.

In another embodiment of the present teachings, the quantity of one or more vessel activities carried out in each discrete geographic zone 1424 may be displayed on a display interface. Preferably, the vessel activity quantity is retrieved from an electronic table (e.g., electronic table 1200 of FIG. 12). By way of example, to display a map of fishing activities within map 1300, the quantity of fishing activities from each discrete geographic zone is retrieved from electronic table 1200 and the quantity is displayed on a corresponding discrete geographic zone of map 1300.

In another aspect of the present teachings, the numerical value in each discrete geographic zone is represented by a unique color on the display interface. The display color may be determined, for example, by using an electronic lookup table. The lookup table provides one or more ranges of values (e.g., 0-0.9, 1-1.9, 2-2.9, and 3-3.9) and corresponding display colors for each range of values (e.g., 0-0.9-Green, 1-1.9-Blue, 2-2.9-Yellow, and 3-3.9-Red). In this manner, the map provides a visual representation showing the intensity of a vessel activity in each discrete geographic zone.

Figure 14:
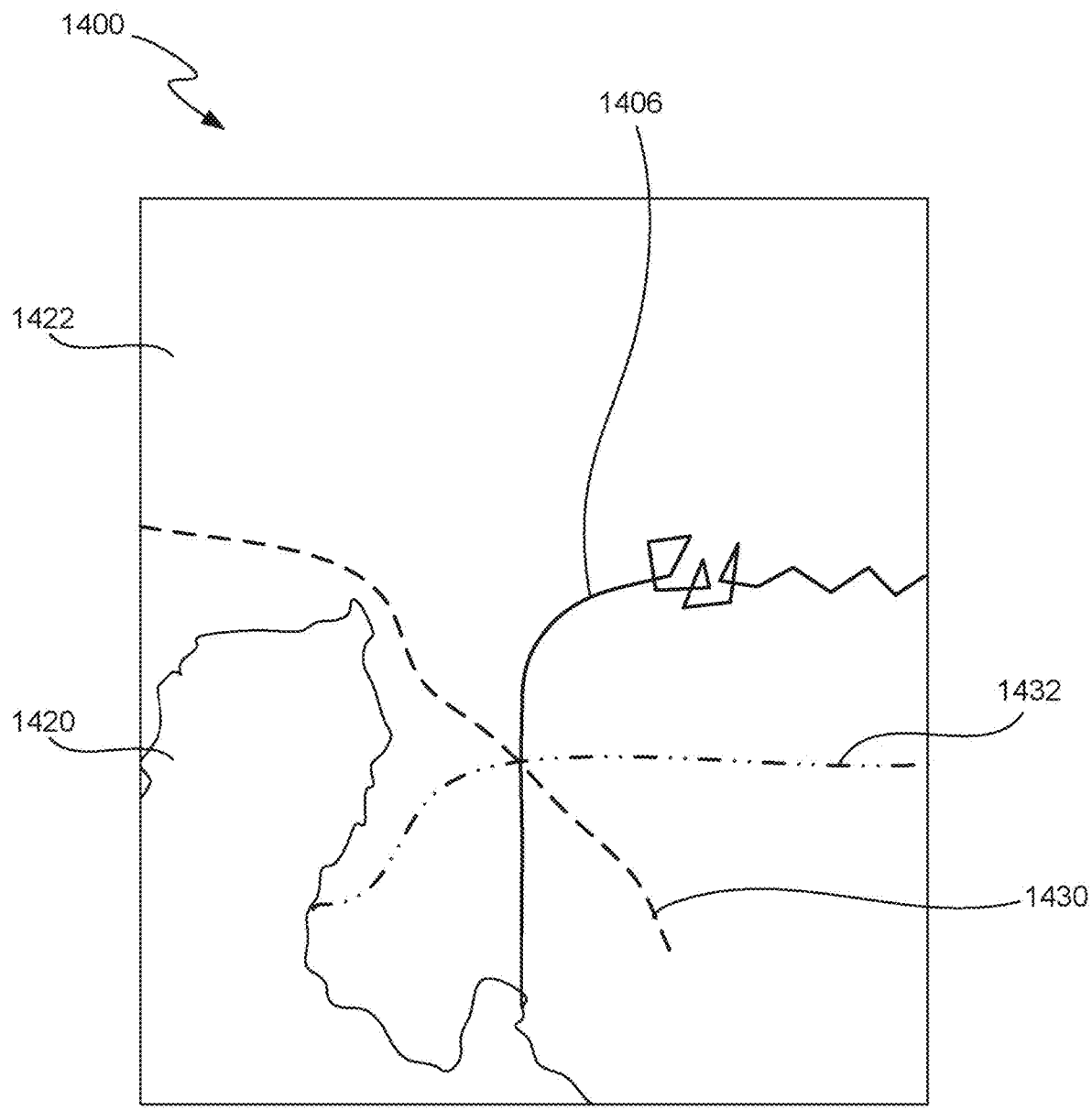
FIG. 14 shows a visual representation of the map of FIG. 9 that includes multiple vessel paths.

FIG. 14 shows a displayed map 1400, according to another embodiment of the present teaching, which shows multiple vessel paths over a given period of time. Vessel paths may be from multiple paths of a single vessel over a period of time or vessel paths of two or more vessels of a period of time. Displayed map 1400 includes a land mass 1420, a body of water 1422, a first vessel path 1406, a second vessel path 1430, and a third vessel path 1432.

In another embodiment of the present teachings, the server may display or cause to display sub-paths (e.g., sub-paths 812, 814, 816, and 818 of FIG. 8) of one or more of the vessel paths in geographic region. Each sub-path may be displayed directly on a geographic map and/or each sub-path have a color component that corresponds to a particular vessel activity. In this manner, a user may visually see which portions of a path a certain vessel activity occurred.

In yet another embodiment of the present teachings, the method of tracking vessel activities may be used to identify the location of gear that a vessel left or lost in the water. The server may receive data from an auxiliary detachment sensor that includes the time and date the gear entered the water and data from the GPS receiver that identifies the location of the vessel when the gear entered the water. Furthermore, the server may receive water current and/or velocity data at or near the location of the vessel when the gear was disposed or placed in the water. Using a statistical algorithm, the server may identify the location of the lost or left gear. By way of example, the server may determine a duration of time that has elapsed between when the gear left the vessel and the current time. Using the water current velocity and direction along with the elapsed time interval, the server may determine or estimate the distance and direction the lost or left gear may have traveled. Thus the server can identify or estimate the current location of the gear.

Although illustrative embodiments of this invention have been shown and described, other modifications, changes, and substitutions are intended. Accordingly, it is appropriate that the appended claims be construed broadly and in a manner consistent with the scope of the disclosure, as set forth in the following claims.

What is claimed is:

1. A method of tracking vessel activities, said method comprising:
   receiving data, using one or more devices, including vessel positioning data and/or time associated with one or more vessels traversing one or more paths on a body of water;
   identifying, using said processor, one or more types of vessel activities of one or more of said vessels at certain positions and/or time along one or more of said paths;
   parsing, using said processor, an electronic map of said body of water and land surrounding said body of water into discrete geographic zones, each of which defines a boundary around a water region and/or a land region that is located within said electronic map and some of which include at least a portion of one or more of said paths of one or more of said vessels;
   grouping, using said processor, one or more types of vessel activities being carried out in each of said discrete geographic zones to arrive at one or more types of grouped vessel activities; and
   causing to display or displaying, on a display interface, said electronic map including said boundary surrounding each of said discrete geographic zones and, located within said boundary of at least some of said discrete geographic zones, one or more types of grouped vessel activities that are being carried out in said discrete geographic zones.

2. The method of claim 1, wherein receiving includes receiving data from at least one sensor chosen from a group comprising accelerometer sensor, compass sensor, gyroscope sensor, vibration sensor, humidity sensor, salinity sensor, motor load sensor, depth sensor, pressure sensor, light sensor, internal core device sensor, solar panel irradiance sensor, battery charge sensor, altimeter sensor, Automatic Identification System ("AIS") receiver/data logger, motor-run sensor, personnel sensor, fish-hold temperature sensor, water temperature sensor, and auxiliary detachment sensor.

3. The method of claim 1, wherein receiving includes receiving one or more type of data, wherein each said data type is associated with at least one vessel and is chosen from a group comprising vessel size, vessel capacity, vessel target species, vessels onboard gear, vessel infractions, and previous vessel trips.

4. The method of claim 1, wherein receiving includes receiving one or more types of external data, wherein each said data type is chosen from a group comprising vessel elevation, depth of water, water temperature, chlorophyll content, ocean color, wave height, weather, wind speed, air temperature, cloud cover, sun rise, sun set, and tides.

5. The method of claim 1, wherein one or more of said devices includes a core device and said core device includes at least one internal sensor chosen from a group comprising light sensor, accelerometer, compass, internal temperature sensor, solar panel irradiance sensor, global positioning sensor, altimeter, gyroscope and battery charging and/or performance sensor.

6. The method of claim 5, wherein said core device includes an inter-device radio for communicating with one or more of external devices.

7. The method of claim 1, wherein causing to display includes generating one or more electronic maps.

8. The method of claim 1, wherein said one or more of said devices further comprises an external sensor including a sensor not incorporated inside and disposed external to said core device.

9. The method of claim 1, wherein said receiving data includes obtaining encrypted data.

10. A method of tracking vessel activity, said method comprising:
receiving data, using one or more devices, including vessel positioning data and/or time associated with one or more vessels traversing one or more paths on a body of water;
identifying, using said processor, one or more types of vessel activities of one or more of said vessels at said certain positions and/or time along one or more of said paths;
assigning, using said processor, an activity weight value to each type of said vessel activities;
parsing, using said processor, an electronic map of said body of water and land surrounding said body of water into discrete geographic zones, each of which defines a boundary around a water region and/or a land region that is located within said electronic map and some of which include at least a portion of one or more of said paths of one or more of said vessels;
grouping, using said processor, one or more types of vessel activities being carried out in each of said discrete geographic zones to arrive at one or more types of grouped vessel activities within said discrete geographic zones; and
using said activity weight value for each type of said vessel activities, calculating, using said processor, a vessel activity score for each type of said grouped vessel activities within said discrete geographic zones or calculating a geographic zone score for each of said discrete geographic zones.

11. The method of tracking vessel activity of claim 10, further comprising causing to display and/or displaying, on a display interface, said electronic map including said boundary surrounding each of said discrete geographic zones and, located within said boundary of at least some of said discrete geographic zones, said vessel activity score for one or more of said grouped vessel activities within each of said discrete geographic zones.

12. The method of tracking vessel activity of claim 11, wherein said vessel activity score includes a fishing pressure score for each of said discrete geographic zones.

13. The method of tracking vessel activity of claim 10, further comprising causing to display and/or displaying, on a display interface, said electronic map including said boundary surrounding each of said discrete geographic zones and, located within said boundary of at least some of said discrete geographic zones, said geographic zone score for each of said discrete geographic zones.

14. The method of tracking vessel activity of claim 10, wherein said identifying one or more of said vessel activities comprises:
analyzing, at one or more locations and/or times of said vessel along one or more paths of said vessel on said body of water, one or more vessel attributes at and around one or more of said locations and/or times to arrive at a vessel attribute and/or vessel attribute pattern; and
matching said vessel attribute or vessel attribute pattern to a corresponding predefined vessel activity.

15. The method of tracking vessel activity of claim 14, further comprising causing to display and/or displaying, based on said attribute type or pattern in said analyzing, position of said vessel as broken up sub-paths.

* * * * *